US012607788B2

(12) United States Patent
Jung et al.

(10) Patent No.: US 12,607,788 B2
(45) Date of Patent: Apr. 21, 2026

(54) SPECTRAL FILTER, IMAGE SENSOR INCLUDING THE SPECTRAL FILTER, AND ELECTRONIC DEVICE INCLUDING THE SPECTRAL FILTER

(71) Applicant: SAMSUNG ELECTRONICS CO., LTD., Suwon-si (KR)

(72) Inventors: Youngho Jung, Suwon-si (KR); Hyochul Kim, Suwon-si (KR); Younggeun Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/204,139

(22) Filed: May 31, 2023

(65) Prior Publication Data

US 2024/0027663 A1      Jan. 25, 2024

(30) Foreign Application Priority Data

Jul. 22, 2022    (KR) ........................ 10-2022-0091323
Jan. 9, 2023    (KR) ........................ 10-2023-0002850

(51) Int. Cl.
*G02B 5/20* (2006.01)
*G02B 5/26* (2006.01)
*H04N 25/13* (2023.01)

(52) U.S. Cl.
CPC .............. *G02B 5/201* (2013.01); *G02B 5/26* (2013.01); *H04N 25/134* (2023.01)

(58) Field of Classification Search
CPC ........ G02B 5/288; G02B 5/201; G02B 5/284; G02B 5/26
See application file for complete search history.

(56) References Cited

U.S. PATENT DOCUMENTS 10,571,612 B2    2/2020 Frey et al.
10,651,220 B2    5/2020 Huang et al.
(Continued)

FOREIGN PATENT DOCUMENTS

EP    3771892 A1    2/2021
JP    6542511 B2    7/2019
(Continued)

OTHER PUBLICATIONS

European Extended Search Report issued Jan. 16, 2024 by the European Patent Office for EP Patent Application No. 23183300.5.

*Primary Examiner* — Van N Chow
(74) *Attorney, Agent, or Firm* — Sughrue Mion, PLLC

(57) ABSTRACT

A spectral filter includes: a plurality of first filter arrays, each of the plurality of first filter arrays including a plurality of band filters; and a plurality of second filter arrays respectively provided on the plurality of first filter arrays, each of the plurality of second filter arrays including a plurality of unit filters respectively corresponding to the plurality of band filters. Each of the plurality of unit filters includes: a first reflecting plate; a second reflecting plate disposed above the first reflecting plate; and a plurality of cavities disposed between the first and second reflecting plates, each of the plurality of cavities having central wavelengths of different bands. Each of the plurality of cavities includes a cavity lower layer, a cavity upper layer, and a dielectric separation layer disposed between the cavity lower layer and the cavity upper layer.

21 Claims, 37 Drawing Sheets

(56)     References Cited

U.S. PATENT DOCUMENTS

|  |  |  |  |  |
|---|---|---|---|---|
| 10,895,674 | B2 | 1/2021 | Frey et al. | |
| 12,135,434 | B2 * | 11/2024 | Park | G02B 5/3083 |
| 2017/0108631 | A1 | 4/2017 | Murakawa et al. | |
| 2018/0372546 | A1 | 12/2018 | Enichlmair et al. | |
| 2019/0277693 | A1 | 9/2019 | Kim et al. | |
| 2020/0403023 | A1 | 12/2020 | Huang et al. | |
| 2021/0033466 | A1 * | 2/2021 | Kim | G02B 5/18 |
| 2021/0048342 | A1 | 2/2021 | Kim et al. | |
| 2021/0187907 | A1 | 6/2021 | Lee et al. | |
| 2021/0191019 | A1 * | 6/2021 | Toda | H04N 23/12 |
| 2021/0318477 | A1 | 10/2021 | Kim et al. | |
| 2021/0341657 | A1 | 11/2021 | Ishikawa et al. | |
| 2022/0003906 | A1 | 1/2022 | Kim et al. | |
| 2022/0020796 | A1 | 1/2022 | Kim et al. | |
| 2022/0028909 | A1 | 1/2022 | Kim et al. | |
| 2022/0113458 | A1 | 4/2022 | Kawashita et al. | |
| 2022/0128407 | A1 | 4/2022 | Lee et al. | |
| 2023/0217122 | A1 * | 7/2023 | Kim | G02B 5/284 |
| | | | | 348/294 |
| 2023/0349758 | A1 | 11/2023 | Kim et al. | |

FOREIGN PATENT DOCUMENTS

| | | | |
|---|---|---|---|
| KR | 10-1841131 | B1 | 3/2018 |
| KR | 10-2021-0125397 | A | 10/2021 |
| KR | 10-2022-0003955 | A | 1/2022 |
| KR | 10-2022-0011072 | A | 1/2022 |
| KR | 10-2022-0012807 | A | 2/2022 |
| KR | 10-2023-0153907 | A | 11/2023 |

* cited by examiner

| C1 | C3 | C5 | C7 |
|----|----|----|----|
| C2 | C4 | C6 | C8 |
| C9 | C11 | C13 | C15 |
| C10 | C12 | C14 | C16 |

SPECTRAL FILTER, IMAGE SENSOR INCLUDING THE SPECTRAL FILTER, AND ELECTRONIC DEVICE INCLUDING THE SPECTRAL FILTER

CROSS-REFERENCE TO RELATED APPLICATION

This application is based on and claims priority under 35 U.S.C. § 119 to Korean Patent Application Nos. 10-2022-0091323 and 10-2023-0002850, filed on Jul. 22, 2022 and Jan. 9, 2023, respectively, in the Korean Intellectual Property Office, the disclosures of which are incorporated by reference herein in their entireties.

BACKGROUND

1. Field

The disclosure relates to a spectral filter and an image sensor and an electronic device each including the spectral filter

2. Description of the Related Art

Conventional image sensors classify wavelength bands into three sections, i.e., red (R), green (G), and blue (B). This results in limited the color expression accuracy and object recognition performance. Existing spectral filters that attempt to improve this limited color expression accuracy and object recognition performance have been used for special-purpose cameras which include bulky and complex optical element parts. Research and development of technologies regarding an image sensor with a spectral filter integrated on a semiconductor chip are ongoing.

SUMMARY

Provided are a spectral filter and an image sensor and an electronic device each including the spectral filter.

Additional aspects will be set forth in part in the description which follows and, in part, will be apparent from the description, or may be learned by practice of the presented embodiments of the disclosure.

A spectral filter may include: a plurality of first filter arrays, each of the plurality of first filter arrays including a plurality of band filters; and a plurality of second filter arrays respectively provided on the plurality of first filter arrays, each of the plurality of second filter arrays including a plurality of unit filters respectively corresponding to the plurality of band filters. Each of the plurality of unit filters may include: a first reflecting plate; a second reflecting plate disposed above the first reflecting plate; and a plurality of cavities disposed between the first and second reflecting plates, each of the plurality of cavities having central wavelengths of different bands. Each of the plurality of cavities may include a cavity lower layer, a cavity upper layer, and a dielectric separation layer disposed between the cavity lower layer and the cavity upper layer. The dielectric separation layer may have a refractive index less than or equal to a maximum refractive index of the cavity lower layer of each of the plurality of cavities and the cavity upper layer of each of the plurality of cavities. Each of the plurality of band filters may be configured to transmit light in a specific band. The plurality of cavities of two or more of the plurality of unit filters may be configured to have a same effective refractive index.

The dielectric separation layer may be made of a material that has a refractive index less than or equal to a highest refractive index of materials constituting the cavity lower layer of each of the plurality of cavities and the cavity upper layer of each of the plurality of cavities.

Each of the plurality of cavities may be configured to have central wavelengths of different bands in a wavelength range of 400 nm to 700 nm.

Each of the plurality of cavities may have a thickness of 100 nm to 2,000 nm.

The dielectric separation layer may include at least one of hafnium oxide (HfO2) or titanium oxide (TiO2).

The dielectric separation layer may have a thickness of 10 nm to 100 nm.

The first filter array may include a color filter array or a broadband filter array.

The plurality of cavities may be of uniform thickness, and each of the plurality of cavities may include a specific dielectric pattern.

The cavity lower layer and the cavity upper layer of each of the plurality of cavities may be of different thicknesses.

The cavity lower layer and the cavity upper layer of each of the plurality of cavities may be of uniform thickness.

The specific dielectric pattern of each of the plurality of cavities may include a lower dielectric pattern of the cavity lower layer and an upper dielectric pattern of the cavity upper layer.

The specific dielectric pattern of two or more of the plurality of cavities may be identical.

Each of the plurality of first filter arrays and each of the plurality of second filter arrays may form a channel array having N channels, each of the N channels including a corresponding band filter of the plurality of band filters and a unit filter of the plurality of unit filters. When a number of band filters of different types is A, a number N' of cavities having different effective refractive indices may satisfy $N/A \leq N' < N$.

Unit filters having a same central wavelength among the plurality of second filter arrays are configured such that effective refractive indies of the respective plurality of cavities may vary according to positions of the unit filters so as to compensate for a central wavelength shift caused by a change in a chief ray angle (CRA) of an incident light.

Each of the first and second reflecting plates may include a metal reflecting plate or a Bragg reflecting plate.

Each of the plurality of cavities may further include: a cavity intermediate layer provided between the dielectric separation layer and the cavity upper layer; and an additional dielectric separation layer provided between the cavity intermediate layer and the cavity upper layer.

An image sensor may include: a pixel array comprising a plurality of pixels; and a spectral filter provided on the pixel array. The spectral filter may include: a plurality of first filter arrays, each of the plurality of filter arrays including a plurality of band filters; and a plurality of second filter arrays respectively provided on the plurality of first filter arrays, each of the plurality of second filter arrays including a plurality of unit filters respectively corresponding to the plurality of band filters. Each of the plurality of unit filters may include: a first reflecting plate; a second reflecting plate disposed above the first reflecting plate; and a plurality of cavities disposed between the first and second reflecting plates, each of the plurality of cavities having central wavelengths of different bands. Each of the plurality of cavities may include a cavity lower layer, a cavity upper layer, and a dielectric separation layer disposed between the cavity lower layer and the cavity upper layer. The dielectric separation layer may have a refractive index less than or equal to a maximum refractive index of the cavity lower layer of each of the plurality of cavities and the cavity upper layer of each of the plurality of cavities. Each of the plurality of band filters may be configured to transmit light in a specific band. The plurality of cavities of two or more of the plurality of unit filters may be configured to have a same effective refractive index.

Each of the plurality of pixels may include: a wiring layer comprising a driving circuit therein, and a photodiode disposed on the wiring layer.

The first filter array may include a color filter array or a broadband filter array.

Each of the plurality of cavities may be configured to have central wavelengths of different bands in a wavelength range of 400 nm to 700 nm.

An electronic device may include an image sensor. The image sensor may include: a pixel array comprising a plurality of pixels; and a spectral filter provided on the pixel array. The spectral filter may include: a plurality of first filter arrays, each of the plurality of filter arrays including a plurality of band filters; and a plurality of second filter arrays respectively provided on the plurality of first filter arrays, each of the plurality of second filter arrays including a plurality of unit filters respectively corresponding to the plurality of band filters. Each of the plurality of unit filters may include: a first reflecting plate; a second reflecting plate disposed above the first reflecting plate; and a plurality of cavities disposed between the first and second reflecting plates, each of the plurality of cavities having central wavelengths of different bands. Each of the plurality of cavities may include a cavity lower layer, a cavity upper layer, and a dielectric separation layer disposed between the cavity lower layer and the cavity upper layer. The dielectric separation layer may have a refractive index less than or equal to a maximum refractive index of the cavity lower layer of each of the plurality of cavities and the cavity upper layer of each of the plurality of cavities. Each of the plurality of band filters may be configured to transmit light in a specific band. The plurality of cavities of two or more of the plurality of unit filters may be configured to have a same effective refractive index.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A is a plan view illustrating a first filter array of the spectral filter shown in FIG. 2;

FIG. 3B is a plan view illustrating a second filter array of the spectral filter shown in FIG. 2;

FIGS. 8A and 8B illustrate examples of first and second filter arrays that may be applied to a spectral filter shown in FIG. 4;

DETAILED DESCRIPTION

Figure 1:
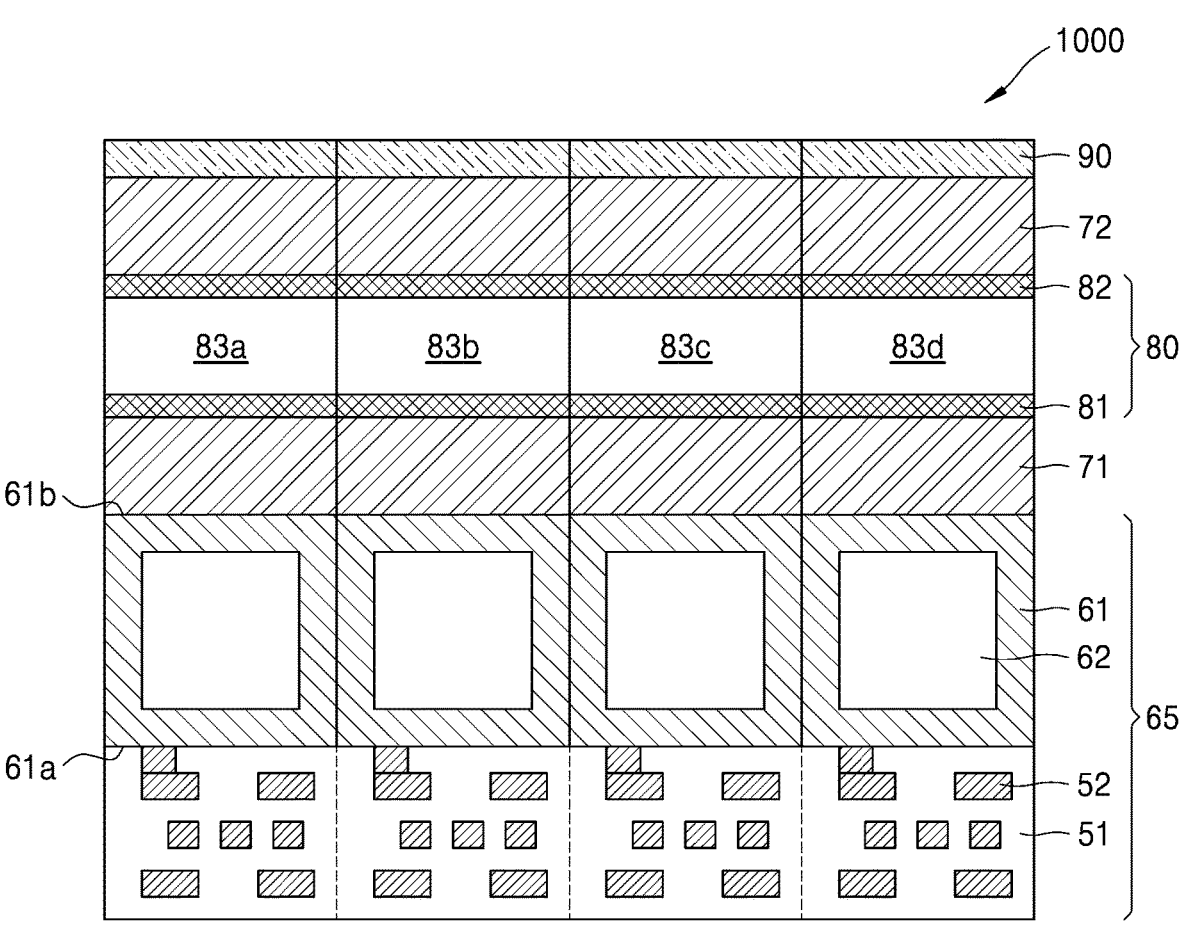
FIG. 1 is a schematic cross-sectional view of an image sensor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. Like reference numerals in the drawings denote like elements, and the size of each element in the drawings may be exaggerated for clarity and convenience of description. Meanwhile, embodiments described below are merely examples, and various modifications may be made from these embodiments.

Hereinafter, what is described as "above" or "on" may include those directly on, underneath, left, and right in contact, as well as above, below, left, and right in non-contact. The singular forms are intended to include the plural forms as well, unless the context clearly indicates otherwise. Also, when a part "includes" any element, it means that the part may further include other elements, rather than excluding other elements, unless otherwise stated.

The term "the" and the similar indicative terms may be used in both the singular and the plural. If there is no explicit description of the order of steps constituting a method or no contrary description thereto, these steps may be performed in an appropriate order, and are not limited to the order described.

In addition, the terms " . . . unit", "module", etc. described herein mean a unit that processes at least one function or operation, may be implemented as hardware or software, or may be implemented as a combination of hardware and software.

Connections of lines or connection members between elements shown in the drawings are illustrative of functional connections and/or physical or circuitry connections, and may be replaced in an actual device, or may be represented as additional various functional connections, physical connections, or circuitry connections.

The use of all examples or example terms is merely for describing the technical concept in detail, and the scope thereof is not limited by these examples or example terms unless limited by claims.

FIG. 1 is a schematic cross-sectional view of an image sensor 1000 according to an embodiment. The image sensor 1000 of FIG. 1 may include, for example, a complementary metal oxide semiconductor (CMOS) image sensor or a charge-coupled device (CCD) image sensor.

With reference to FIG. 1, the image sensor 1000 may include a pixel array 65 and a resonator structure 80 arranged on the pixel array 65. The pixel array 65 may include a plurality of pixels arranged in a two-dimensional (2D) form, and the resonator structure 80 may include a plurality of resonators arranged in correspondence with the plurality of pixels. FIG. 1 illustrates a case where the pixel array 65 includes four pixels, and the resonator structure 80 includes four resonators.

Each pixel of the pixel array 65 may include a photodiode 62, which is a photoelectric transformation element, and a driver circuit 52 to drive the photodiode 62. The photodiode 62 may be buried in a semiconductor substrate 61. The semiconductor substrate 61 may be, for example, a silicon substrate. However, the disclosure is not limited thereto. A wiring layer 51 may be arranged on a lower surface 61a of the semiconductor substrate 61, and the driver circuit 52, such as a metal oxide silicon field effect transistor (MOS-FET), etc. may be arranged in the wiring layer 51.

The resonator structure 80 including a plurality of resonators may be arranged above the semiconductor substrate 61. Each resonator may be arranged to transmit light of a particular desired wavelength region. Each resonator may include a first reflection layer 81 and a second reflection layer 82, which are spaced apart from each other, and cavities 83a, 83b, 83c, and 83d arranged between the first reflection layer 81 and the second reflection layer 82. Each of the first reflection layer 81 and the second reflection layer 82 may include, for example, a metal reflection layer or a Bragg reflection layer. Each of the cavities 83a, 83b, 83c, and 83d may be arranged to cause resonance of light of a particular desired wavelength region.

A first functional layer 71 may be arranged between an upper surface 61b of the semiconductor substrate 61 and the resonator structure 80. The first functional layer 71 may improve a transmittance of light passing through the resonator structure 80 and incident towards the photodiode 62. To this end, the first functional layer 71 may include a dielectric layer or a dielectric pattern with adjusted refractive index.

A second functional layer 72 may be arranged on an upper surface of the resonator structure 80. The second functional layer 72 may improve a transmittance of light incident towards the resonator structure 80. To this end, the second functional layer 72 may include a dielectric layer or a dielectric pattern with adjusted refractive index. A third functional layer 90 may be further arranged on an upper surface of the second functional layer 72. The third functional layer 90 may include, for example, an anti-reflection layer, a condenser lens, a color filter, a short-wavelength absorption filter, a long-wavelength cut-off filter, etc. However, this is only an example.

At least one of the first to third functional layers 71, 72, and 90 may constitute a spectral filter described below together with the resonator structure 80.

Figure 2:
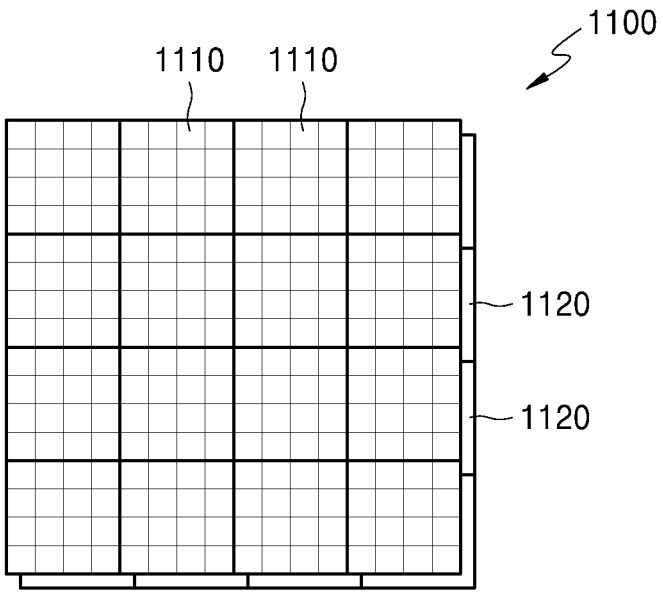
FIG. 2 is a plan view of a spectral filter according to an embodiment.

FIG. 2 is a plan view of an example of a spectral filter 1100 according to an embodiment.

Referring to FIG. 2, the spectral filter 1100 includes a plurality of first filter arrays 1110 and a plurality of second filter arrays 1120. FIG. 2 illustrates an example of 16 first filter arrays 1110 arranged in a 4×4 array and 16 second filter arrays 1120 arranged in a 4×4 array. FIG. 2 illustrates that the plurality of second filter arrays 1120 are respectively provided below the plurality of first filter arrays 1110. However, the disclosure is not limited thereto, and the plurality of second filter arrays 1120 may be respectively provided above the plurality of first filter arrays 1110.

Figure 3A:
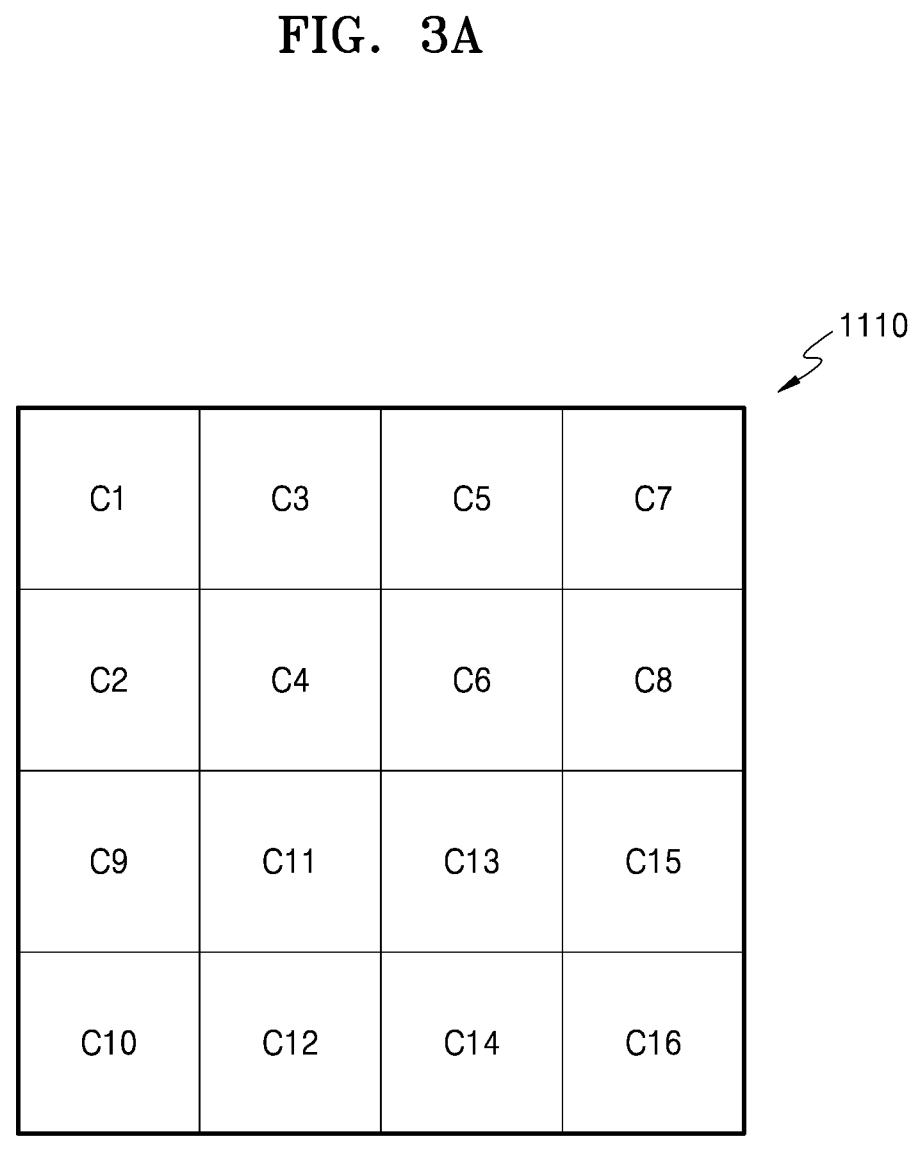

FIG. 3A is a plan view illustrating the first filter array 1110 shown in FIG. 2.

Referring to FIG. 3A, the first filter array 1110 may include a plurality of band filters C1 to C16 arranged in a 2D form. FIG. 3A illustrates that the first filter array 1110 includes 16 band filters C1 to C16 arranged in a 4×4 array. However, the disclosure is not limited thereto, and band filters may be arranged in various forms. For example, the first filter array 1110 may include 9 band filters arranged in a 3×3 array.

Each of the band filters C1 to C16 of the first filter array 1110 may transmit light in a specific band. For example, the first filter array 1110 may be a color filter array including a red color filter, a green color filter, and a blue color filter. In this case, the band filters C1 to C16 constituting the first filter array 1110 may be of three types. Specifically, some of the band filters C1 to C16 may be red color filters, others may be green color filters, and others may be blue color filters. The red color filter may transmit red light having a wavelength band of about 600 nm to about 700 nm, the green color filter may transmit green light having a wavelength band of about 500 nm to about 600 nm, and the blue color filter may transmit blue light having a wavelength band of about 400 nm to about 500 nm. For example, a color filter array typically applied to a color display device such as a liquid crystal display device or an organic light-emitting display devices may be used as a color filter array including the red, green and blue color filters. Meanwhile, the first filter array 1110 may be a broadband filter array. In this case, each of the band filters C1 to C16 of the first filter array 1110 may have a full width at half maximum (FWHM) of about 50 nm to about 150 nm.

Figure 3B:
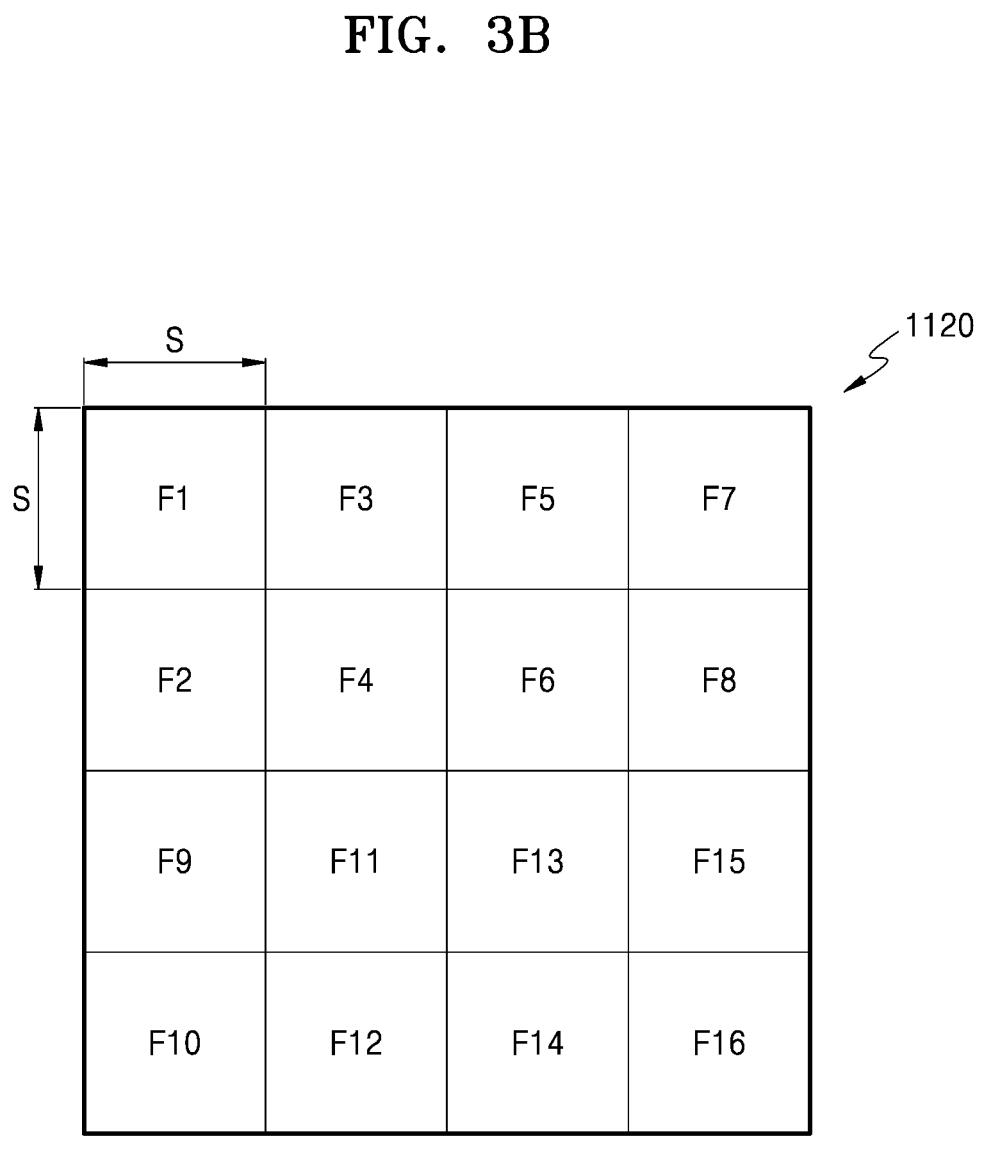

FIG. 3B is a plan view illustrating the second filter array 1120 disposed on the first filter array 1110 shown in FIG. 3B.

Referring to FIG. 3B, the second filter array 1120 may include a plurality of unit filters F1 to F16 arranged in a 2D form. Here, the plurality of unit filters F1 to F16 may be provided in a one-to-one correspondence with the plurality of band filters C1 to C16. FIG. 3B illustrates 16 unit filters F1 to F16 in which the second filter array 1120 is arranged in a 4×4 array. However, the disclosure is not limited thereto, and band filters may be arranged in various forms. For example, the second filter array 1120 may include 9 unit filters arranged in a 3×3 array. A size S of each of the unit filters F1 to F16 may be, for example, about 0.4 μm to about 100 μm, but is not limited thereto.

Each of the unit filters F1 to F16 constituting the second filter array 1120 may have central wavelengths of different bands within a visible light wavelength region (e.g., a band of about 400 nm to about 700 nm).

A channel array including 16 channels may be configured by combining the band filters C1 to C16 of the first filter array 1110 shown in FIG. 3A and the unit filters F1 to F16 of the second filter array 1120 shown in FIG. 3B, and lights having different central wavelengths may be output through these channels.

Figure 4:
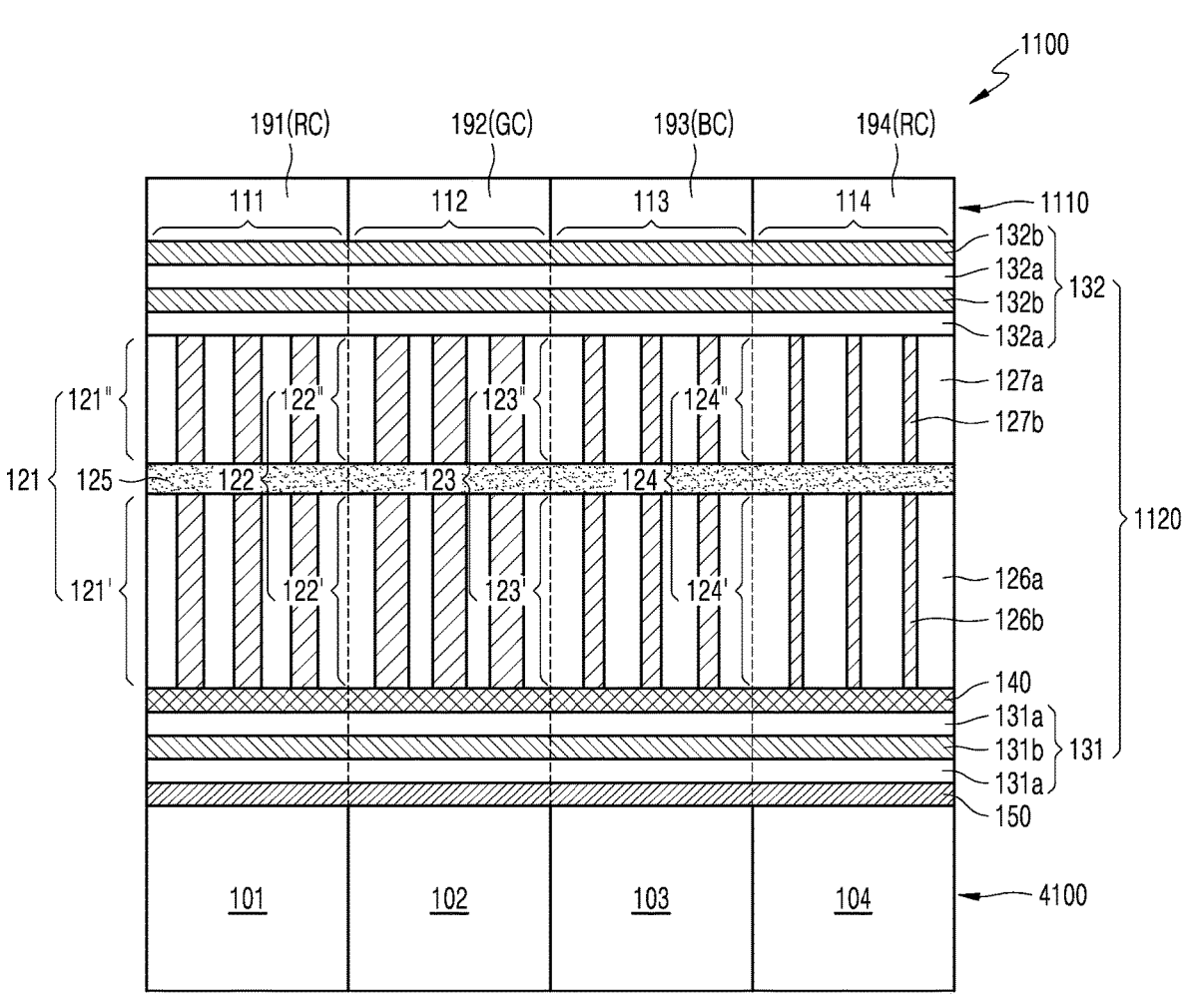
FIG. 4 is a cross-sectional view of a spectral filter according to an embodiment.
Figure 5A:
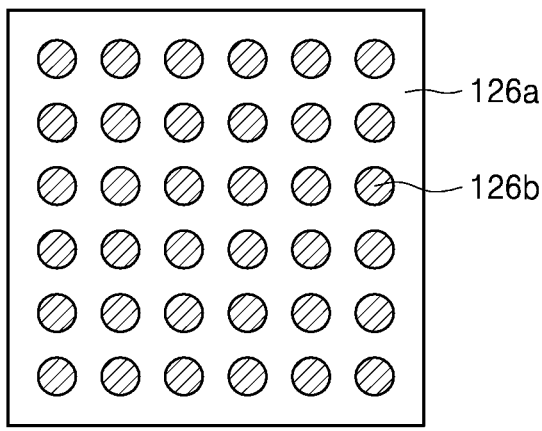
FIGS. 5A to 5D illustrate an example of lower dielectric patterns that may be applied to cavity lower layers shown in FIG. 4.
Figure 5B:
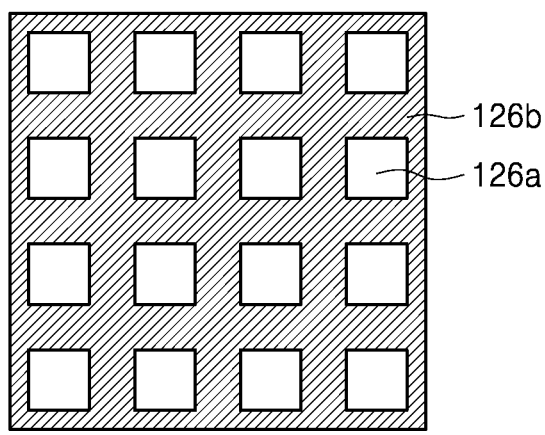
Figure 5C:
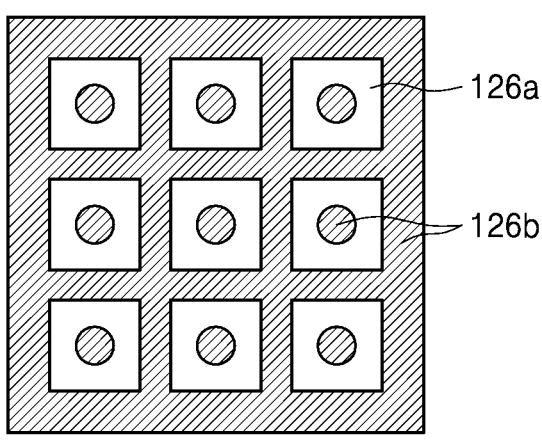
Figure 5D:
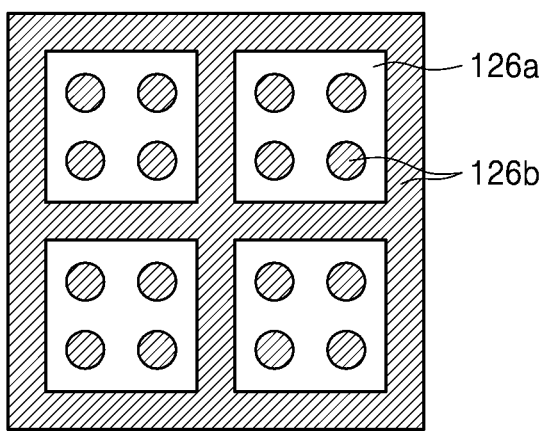

FIG. 4 is a cross-sectional view of the spectral filter 1100 according to an embodiment.

Referring to FIG. 4, the spectral filter 1100 includes the first filter array 1110 and the second filter array 1120 disposed on the first filter array 1110. FIG. 4 illustrates that the second filter array 1120 is disposed below the first filter array 1110, but the second filter array 1120 may be disposed above the first filter array 1110. The first filter array 1110 includes a plurality of band filters 191, 192, 193, and 194 arranged in a 2D form. FIG. 4 illustrates four first, second, third, and fourth band filters 191, 192, 193, and 194 constituting the first filter array 1110. The first filter array 1110 may be, for example, a color filter array. FIG. 4 illustrates that the first, second, third, and fourth band filters 191, 192, 193, and 194 are red, green, blue, and red color filters RC, GC, BC, and RC, respectively.

The second filter array 1120 may include a plurality of unit filters 111, 112, 113, and 114 in a one-to-one correspondence with the plurality of band filters 191, 192, 193, and 194. FIG. 4 illustrates four first, second, third, and fourth unit filters 111, 112, 113, and 114 constituting the second filter array 1120.

Each of the first, second, third, and fourth unit filters 111, 112, 113, and 114 may have central wavelengths of different bands within a visible light region (a wavelength region of about 400 nm to about 700 nm). For example, each of the first, second, third, and fourth unit filters 111, 112, 113, and 114 may have a central wavelength of a red light band, a central wavelength of a green light band, and a central wavelength of a blue light band.

A pixel array 4100 may be provided below the second filter array 1120. The pixel array 4100 includes a plurality of pixels 101, 102, 103, and 104 in a one-to-one correspondence with the plurality of unit filters 111, 112, 113, and 114. FIG. 4 illustrates the first, second, third, and fourth pixels 101, 102, 103, and 104 constituting the pixel array 4100.

A passivation layer 150 may be provided between the second filter array 1120 and the pixel array 4100 to protect the pixel array 4100. The passivation layer 150 may include, for example, hafnium oxide, silicon oxide, or silicon nitride, but is not limited thereto.

The first, second, third, and fourth unit filters 111, 112, 113, and 114 may include first and second reflecting plates 131 and 132 spaced apart from each other and first, second, third and fourth cavities 121, 122, 123 and 124 provided between the first and second reflecting plates 131 and 132.

Each of the first and second reflecting plates 131 and 132 may a Bragg reflecting plate. The Bragg reflecting plate may be a distributed Bragg reflector (DBR) having a structure in which two or more dielectrics having different refractive indices are alternately stacked. FIG. 4 shows an example in which the first reflecting plate 131 includes a Bragg reflecting plate in which two dielectrics 131*a* and 131*b* are alternately stacked, and the second reflecting plate 132 includes a Bragg reflecting plate in which two dielectrics 132*a* and 132*b* are alternately stacked.

Each of the first and second reflecting plates 131 and 132 may include a metal reflecting plate. The metal reflecting plate may include, for example, Al, Ag, Au, Cu, Ti, W or TiN but is not limited thereto. In addition, the first and second reflecting plates 131 and 132 may include different material layers. For example, the first reflecting plate 131 may include a Bragg reflecting plate and the second reflecting plate 132 may include a metal reflecting plate. However, this is merely an example.

The first, second, third, and fourth cavities 121, 122, 123, and 124 may be provided between the first and second reflecting plates 131 and 132. The first, second, third, and fourth cavities 121, 122, 123, and 124 may all have the same thickness. Each of the first, second, third, and fourth cavities 121, 122, 123, and 124 may have central wavelengths of different bands (e.g., at least two of a red light band, a green light band, or a blue light band) in a visible light region (a wavelength range of about 400 nm to about 700 nm). To this end, each of the first, second, third, and fourth cavities 121, 122, 123, and 124 may have a thickness of about 100 nm to about 2000 nm. For example, each of the first, second, third, and fourth cavities 121, 122, 123, and 124 may have a thickness of about 200 nm to about 1000 nm.

The first, second, third, and fourth cavities 121, 122, 123, and 124 may respectively include first, second, third, and fourth cavity lower layers 121', 122', 123', and 124', first, second, third, and fourth cavity upper layers 121", 122", 123", and 124" and a dielectric separation layer 125 provided between the first, second, third, and fourth cavity lower layers 121', 122', 123', and 124', and the first, second, third, and fourth cavity upper layers 121", 122", 123", and 124".

The first cavity 121 includes the first cavity lower layer 121', the dielectric separation layer 125, and the first cavity upper layer 121", and the second cavity 122 includes the second cavity lower layer 122", the dielectric separation layer 125, and the second cavity upper layer 122". The third cavity 123 includes the third cavity lower layer 123', the dielectric separation layer 125, and the third cavity upper layer 123", and the fourth cavity 124 123 includes the fourth cavity lower layer 124', the dielectric separation layer 125, and the fourth cavity upper layer 124".

The first, second, third, and fourth cavity lower layers 121', 122', 123', and 124' may have the same thickness and the first, second, third, and fourth cavity upper layers 121", 122", 123", and 124" may have the same thickness. Therefore, the first, second, third, and fourth cavities 121, 122, 123, and 124 may have the same thickness.

The first, second, third, and fourth cavity lower layers 121', 122', 123', and 124' and the first, second, third, and fourth cavity upper layers 121", 122", 123", and 124" may be configured to have different thicknesses or the same thickness. FIG. 4 shows an example in which the first, second, third, and fourth cavity upper layers 121", 122", 123", and 124" are configured to respectively have a smaller thickness than the first, second, third, and fourth cavity lower layers 121', 122', 123', and 124'.

The first, second, third, and fourth cavities 121, 122, 123, and 124 may be configured to have central wavelengths of different bands by adjusting the thickness and the effective refractive index of each of the first, second, third, and fourth cavity lower layers 121', 122', 123', and 124' and the first, second, third, and fourth cavity upper layers 121", 122", 123", and 124".

Each of the first, second, third, and fourth cavities 121, 122, 123, and 124 may include a certain dielectric pattern. The dielectric pattern of each of the first, second, third, and fourth cavities 121, 122, 123, and 124 may include a lower dielectric pattern of each of the first, second, third, and fourth cavity lower layers 121', 122', 123', and 124' and an upper dielectric pattern of each of the first, second, third, and fourth cavity upper layers 121", 122", 123", and 124". Each of the first, second, third, and fourth cavity lower layers 121', 122', 123', and 124' and the first, second, third, and fourth cavity upper layers 121", 122", 123", and 124" may have one or more dielectrics.

Each of the first, second, third, and fourth cavity lower layers 121', 122', 123', and 124' may include a first dielectric 126a and a second dielectric 126b disposed in the first dielectric 126a. Here, the second dielectric 126b may have a refractive index higher than that of the first dielectric 126a. As a specific example, the first dielectric 126a may include silicon oxide, and the second dielectric 126b may include titanium oxide. However, this is only an example.

Figure 6A:
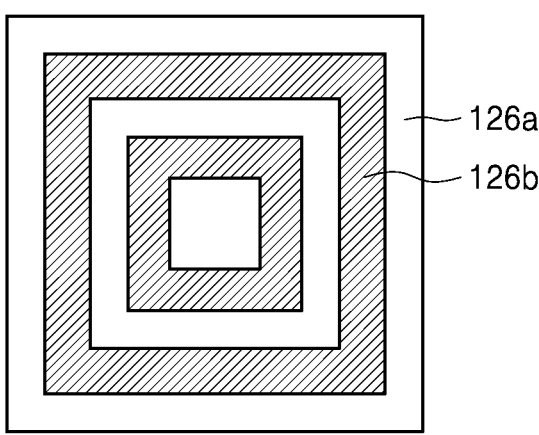
FIGS. 6A to 6B illustrate another example of lower dielectric patterns that may be applied to cavity lower layers shown in FIG. 4.
Figure 6B:
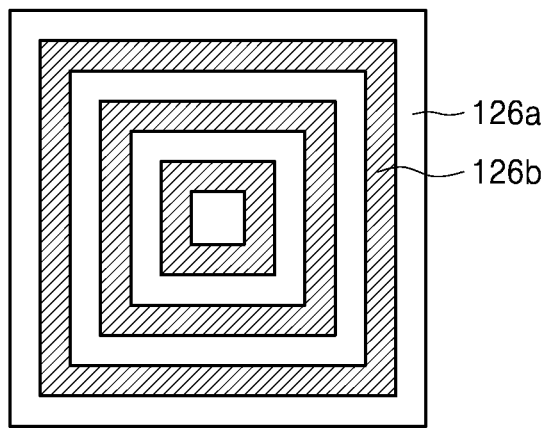

Each of the first, second, third, and fourth cavity lower layers 121', 122', 123', and 124' may have various lower dielectric patterns according to materials, shapes, sizes, and arrangements of the first and second dielectrics 126a and 126b. FIGS. 5A to 5D illustrate lower dielectric patterns that may be applied to the first, second, third, and fourth cavity lower layers 121', 122', 123', and 124' shown in FIG. 4. In addition, FIGS. 6A to 6B illustrate other lower dielectric patterns that may be applied to the first, second, third, and fourth cavity lower layers 121', 122', 123', and 124' shown in FIG. 4.

The effective refractive index of each of the first, second, third, and fourth cavity lower layers 121', 122', 123', and 124' may be adjusted by changing the lower dielectric pattern of each of the first, second, third, and fourth cavity lower layers 121', 122', 123', and 124'. Specifically, the effective refractive index of each of the first, second, third, and fourth cavity lower layers 121', 122', 123', and 124' may be adjusted by changing a volume ratio occupied by the first and second dielectrics 126a and 126b in each of the first, second, third, and fourth cavity lower layers 121', 122', 123', and 124'. For example, the effective refractive index of each of the first, second, third, and fourth cavity lower layers 121', 122', 123', and 124' may increase as the volume ratio of the second dielectric 126b increases in each of the first, second, third, and fourth cavity lower layers 121', 122', 123', and 124'.

Each of the first, second, third, and fourth cavity upper layers 121", 122", 123", and 124" may include a third dielectric 127a and a fourth dielectric 127b disposed in the third dielectric 127a. The fourth dielectric 127b may have a refractive index higher than that of the third dielectric 127a. As a specific example, the third dielectric 127a may include silicon oxide, and the fourth dielectric 127b may include titanium oxide. However, this is only an example.

Like the first, second, third, and fourth cavity lower layers 121', 122', 123', and 124', each of the first, second, third, and fourth cavity upper layers 121", 122", 123", and 124" may have various shapes of upper dielectric patterns according to materials, shapes, sizes, and arrangements of the third and fourth dielectrics 127a and 127b. The effective refractive index of each of the first, second, third, and fourth cavity upper layers 121", 122", 123", and 124" may be adjusted by changing the upper dielectric pattern of each of the first, second, third, and fourth cavity upper layers 121", 122", 123", and 124". Specifically, the effective refractive index of each of the first, second, third, and fourth cavity upper layers 121", 122", 123", and 124" may be adjusted by changing a volume ratio occupied by the third and fourth dielectrics 127a and 127b in each of the first, second, third, and fourth cavity upper layers 121", 122", 123", and 124".

The lower dielectric pattern and the upper dielectric pattern constituting each of the dielectric pattern of each of the first, second, third, and fourth cavities 121, 122, 123, and 124 may be identical to or different from each other. FIG. 4 shows an example in which the lower dielectric pattern and the upper dielectric pattern constituting the dielectric patterns of each of the first, second, third, and fourth cavities 121, 122, 123, and 124 are identical to each other. In this case, the effective refractive index of each of the first, second, third, and fourth cavity lower layers 121', 122', 123', and 124' and the first, second, third, and fourth cavity upper layers 121", 122", 123", and 124" may be adjusted by changing the volume ratio of the second and fourth dielectrics 126b and 127b, and accordingly, the central wavelengths of each of the first, second, third, and fourth cavities 121, 122, 123, and 124 may be adjusted.

Described above is a case where each of the first, second, third, and fourth cavity lower layers 121', 122', 123', and 124' and the first, second, third, and fourth cavity upper layers 121", 122", 123", and 124" includes two dielectrics having different refractive indices. However, the inventive concept is not limited thereto, and each of the first, second, third, and fourth cavity lower layers 121', 122', 123', and 124' and the first, second, third, and fourth cavity upper layers 121", 122", 123", and 124" may include one dielectric or three or more dielectrics The dielectric separation layer 125 is provided between the first, second, third, and fourth cavity lower layers 121', 122', 123', and 124' and the first, second, third, and fourth cavity upper layers 121", 122", 123", and 124". The dielectric separation layer 125 may be configured to have a refractive index less than the maximum refractive index of the first, second, third, and fourth cavity lower layers 121', 122', 123', and 124' and the first, second, third, and fourth cavity upper layers 121", 122", 123", and 124". Specifically, the dielectric separation layer 125 may include a material having a refractive index lower than or equal to the highest refractive index of materials constituting the first, second, third, and fourth cavity lower layers 121', 122', 123', and 124' and the first, second, third, and fourth cavity upper layers 121", 122", 123", and 124".

For example, the dielectric separation layer 125 may include hafnium oxide ($HfO_2$) or titanium oxide ($TiO_2$), but is not limited thereto. As a specific example, when the materials constituting the first, second, third, and fourth cavity lower layers 121', 122', 123', and 124' and the first, second, third, and fourth cavity upper layers 121", 122", 123", and 124" include silicon oxide and titanium oxide, the dielectric separation layer 125 may include titanium oxide or hafnium oxide.

The dielectric separation layer 125 may be provided between the first, second, third, and fourth cavity lower layers 121', 122', 123', and 124' and the first, second, third, and fourth cavity upper layers 121", 122", 123", and 124" to function as an etch stop layer. Accordingly, the manufacturing process of the first, second, third, and fourth cavities 121, 122, 123, and 124 may be facilitated and reproducibility thereof may be improved, and the effective refractive index of each of the first, second, third, and fourth cavity lower layers 121', 122', 123', and 124' and the first, second, third, and fourth cavity upper layers 121", 122", 123", and 124" may also be efficiently adjusted.

In the etching process for manufacturing a cavity of one layer having a relatively great thickness, it may be difficult to accurately obtain desired patterns because an etched part is formed inclined due to the great etching thickness. In the embodiment, the first, second, third, and fourth cavity lower layers 121', 122', 123', and 124' and the first, second, third, and fourth cavity upper layers 121", 122", 123", and 124" of the first, second, third, and fourth cavities 121, 122, 123, and 124 are separated by the dielectric separation layer 125 that may serve as an etch stop layer, and thus, the first, second, third, and fourth cavity lower layers 121', 122', 123', and 124' and the first, second, third, and fourth cavity upper layers 121", 122", 123", and 124" may be formed by a separate etching process in a process of manufacturing the first, second, third, and fourth cavities 121, 122, 123, and 124. Accordingly, the etching process for forming the first, second, third, and fourth cavity lower layers 121', 122', 123', and 124' and the first, second, third, and fourth cavity upper layers 121", 122", 123", and 124" may be easily performed, reproducibility thereof may be also improved, and the effective refractive index of each of the first, second, third, and fourth cavity lower layers 121', 122', 123', and 124' and the first, second, third, and fourth cavity upper layers 121", 122", 123", and 124" may also be efficiently adjusted.

The dielectric separation layer 125 may be formed in various thicknesses according to process conditions of an etching process. For example, the dielectric separation layer 125 may have a thickness of about 10 nm to about 100 nm, but is not limited thereto.

The etch stop layer 140 may be provided between the first reflecting plate 131 and the first, second, third, and fourth cavity lower layers 121', 122', 123', and 124'. The etch stop layer 140 may serve to facilitate a patterning process for forming the first, second, third, and fourth cavity lower layers 121', 122', 123', and 124'. The etch stop layer 140 may include, for example, titanium oxide or hafnium oxide, but is not limited thereto. For example, the etch stop layer 140 may include a material having an etch rate twice or more (e.g., 5 times or more) slower than that of dielectric materials constituting the first, second, third, and fourth cavity lower layers 121', 122', 123', and 124'. However, the etch stop layer 140 is not limited thereto.

Figure 7:
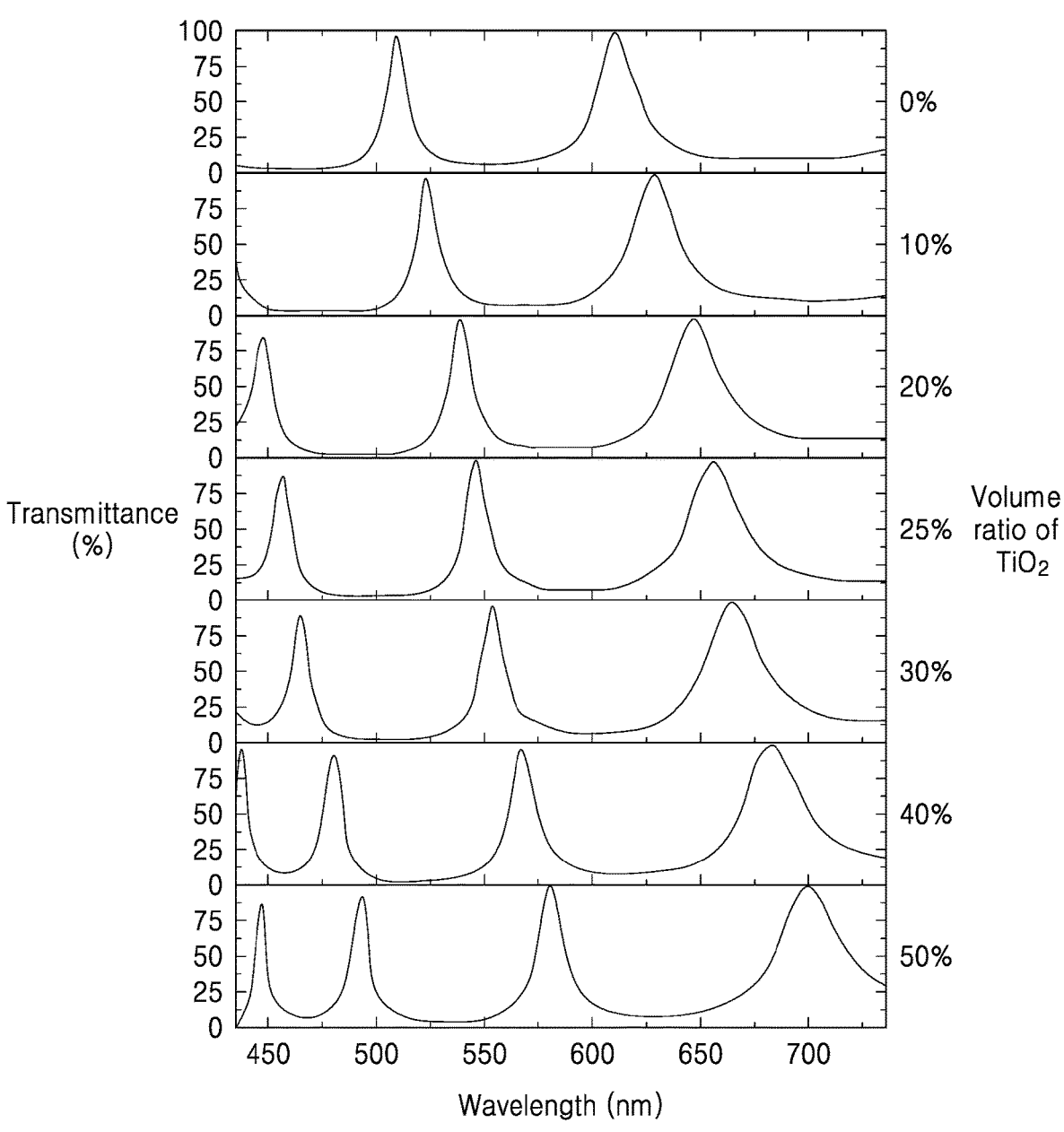
FIG. 7 illustrates simulation results showing transmission spectrums of cavities shown in FIG. 4.

FIG. 7 is a simulation result showing transmission spectrums of the first, second, third, and fourth cavities 121, 122, 123, and 124 shown in FIG. 4. Here, the first and third dielectrics 126a and 127a include silicon oxide ($SiO_2$), and the second and fourth dielectrics 126b and 127b include titanium oxide ($TiO_2$). The first, second, third, and fourth cavity lower layers 121', 122', 123', and 124' are formed to a thickness of 230 nm, and the first, second, third, and fourth cavity upper layers 121", 122", 123", and 124" are formed to a thickness of 210 nm.

FIG. 7 shows transmission spectrums of the first, second, third, and fourth cavities 121, 122, 123, and 124 when a volume ratio of titanium oxide is 0%, 10%, 20%, 25%, 30%, 40%, and 50%. Referring to FIG. 7, it may be seen that each of the first, second, third, and fourth cavities 121, 122, 123, and 124 has two or more central wavelengths of different bands, and the central wavelengths of each of the first, second, third, and fourth cavities 121, 122, 123, and 124 gradually increase as the volume ratio of titanium oxide increases.

In the spectral filter 1100 according to an embodiment, each of the band filters 191, 192, 193, and 194 of the first filter array 1110 may transmit light in a specific band, and each of the unit filters 111, 112, 113, and 114 of the second filter array 1120 may have central wavelengths of different bands. Accordingly, channels including a combination of the band filters 191, 192, 193, and 194 and the unit filters 111, 112, 113, and 114 may have different central wavelengths in a one-to-one correspondence with channels in the wavelength band of about 400 nm to about 700 nm. For example, in a case where each of the unit filters 111, 112, 113, and 114 has a central wavelength of a red light band, a central wavelength of a green light band, and a central wavelength of a blue light band, when the first band filter 191 which is a red color filter RC is disposed above the first unit filter 111, a first channel including a combination of the first band filter 191 and the first unit filter 111 may have the central wavelength of the red light band. In addition, when the second band filter 192 which is a green color filter GC is disposed above the second unit filter 112, a second channel including a combination of the second band filter 192 and the second unit filter 112 may have the central wavelength of the green light band. In addition, when the third band filter 193 which is a blue color filter BC is disposed above the third unit filter 113, a third channel including a combination of the third band filter 193 and the third unit filter 113 may have the central wavelength of the blue light band.

Two or more of cavities of the unit filters (e.g., F1 to F16 of FIG. 3B) constituting the second filter array 1120 may be configured to have the same effective refractive index according to types of the band filters (e.g., C1 to C16 in FIG. 3A) constituting the first filter array 1110. Specifically, two or more of the cavities of the unit filters F1 to F16 may be configured to have the same dielectric pattern (specifically, a lower dielectric pattern and an upper dielectric pattern). For example, when the first filter array 1110 is configured as a color filter array, and each cavity of the second filter array 1120 has a central wavelength of a red light band, a central wavelength of a green light band, and a central wavelength of a blue light band, three cavities may be configured to have the same dielectric pattern and have different central wavelengths.

A channel array having N channels (e.g., 16 channels) may be configured by combining the band filters (e.g., C1 to C16) of the first filter array 1110 and the unit filters (e.g., F1 to F16) of the second filter array 1120. Here, when the number of types of band filters is A, number N' of cavities having different effective refractive indices may satisfy $N/A \leq N' < N$. For example, when a channel array has 16 channels and the number of types of band filters is 3, the number of cavities having different effective refractive indices (i.e., different dielectric patterns) may be equal to or greater than 6 and less than or equal to 15.

Figure 8A:
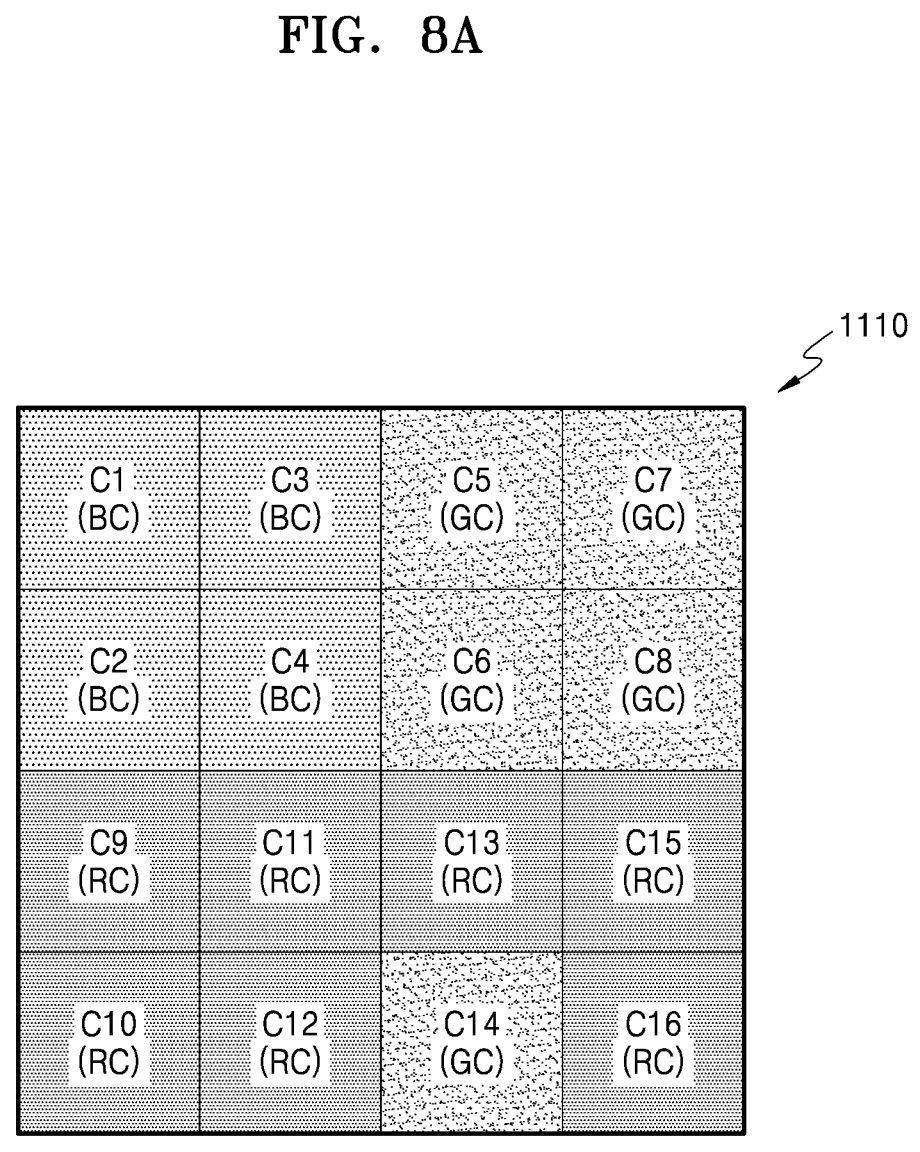
Figure 8B:
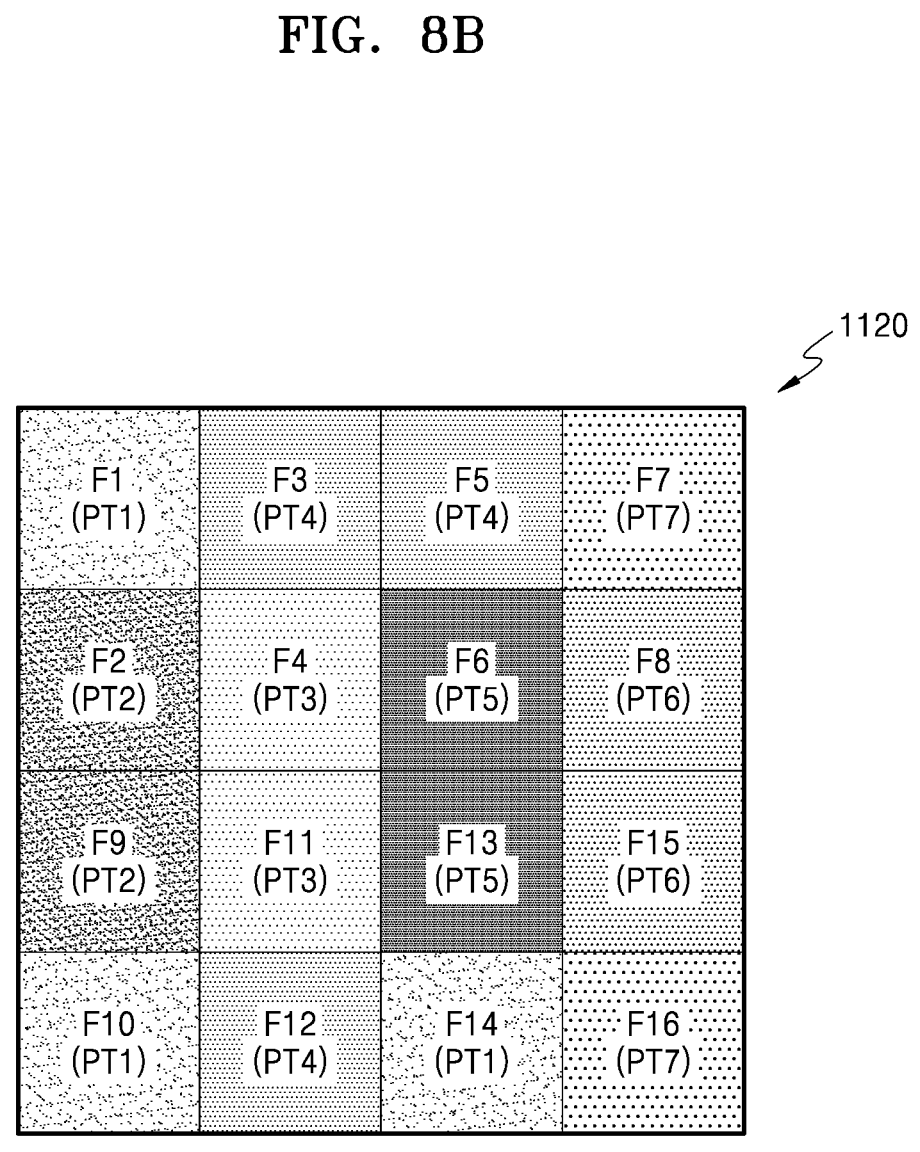

FIGS. 8A and 8B illustrate examples of the first and second filter arrays 1110 and 1120 that may be applied to the spectral filter 1100 according to an embodiment.

FIG. 8A illustrates a color filter array as an example of the first filter array 1110. Referring to FIG. 8A, each of the band filters C1 to C4 uses the blue color filter BC, each of the band filters C5 to C8 and C14 uses the green color filter GC, and each of the band filters C9 to C13 and C15 to C16 uses the red color filter RC.

An example of the second filter array 1120 is shown in FIG. 8B. Referring to FIG. 8B, the second filter array 1120 may include the 16 unit filters F1 to F16 including 7 different dielectric patterns PT1 to PT7. Specifically, cavities of the unit filters F1, F10, and F14 may have the first dielectric pattern PT1, cavities of the unit filters F2 and F9 have the second dielectric pattern PT2, cavities of the unit filters F4 and F11 have the third dielectric pattern PT3, cavities of the unit filters F3, F5, and F12 have the fourth dielectric pattern PT4, cavities of the unit filters F6 and F13 have the fifth dielectric pattern PT5, cavities of the unit filters F8 and F15 have the sixth dielectric pattern PT6, and cavities of the unit filters F7 and F16 have the seventh dielectric pattern PT7.

Figure 9:
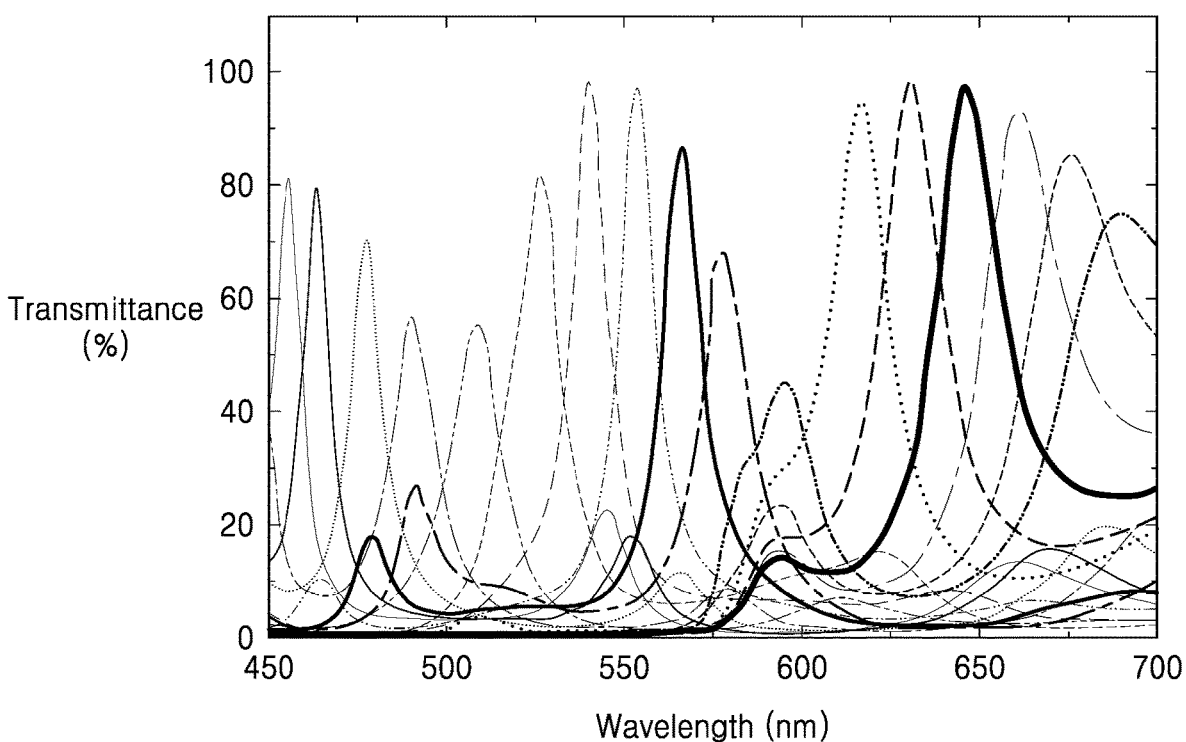
FIG. 9 illustrates simulation result showing a transmission spectrum of light transmitted through the first and second filter arrays shown in FIGS. 9A and 8B.

FIG. 9 is a simulation result showing a transmission spectrum of light transmitted through the first and second filter arrays 1110 and 1120 shown in FIGS. 9A and 8B.

Referring to FIG. 9, it may be seen that even when some of the unit filters F1 to F16 constituting the second filter array 1120 have the same dielectric pattern, 16 different central wavelengths may be implemented in a visible ray region by arranging the first filter array 1110 including the band filters C1 to C16 above the second filter array 1120.

Figure 10:
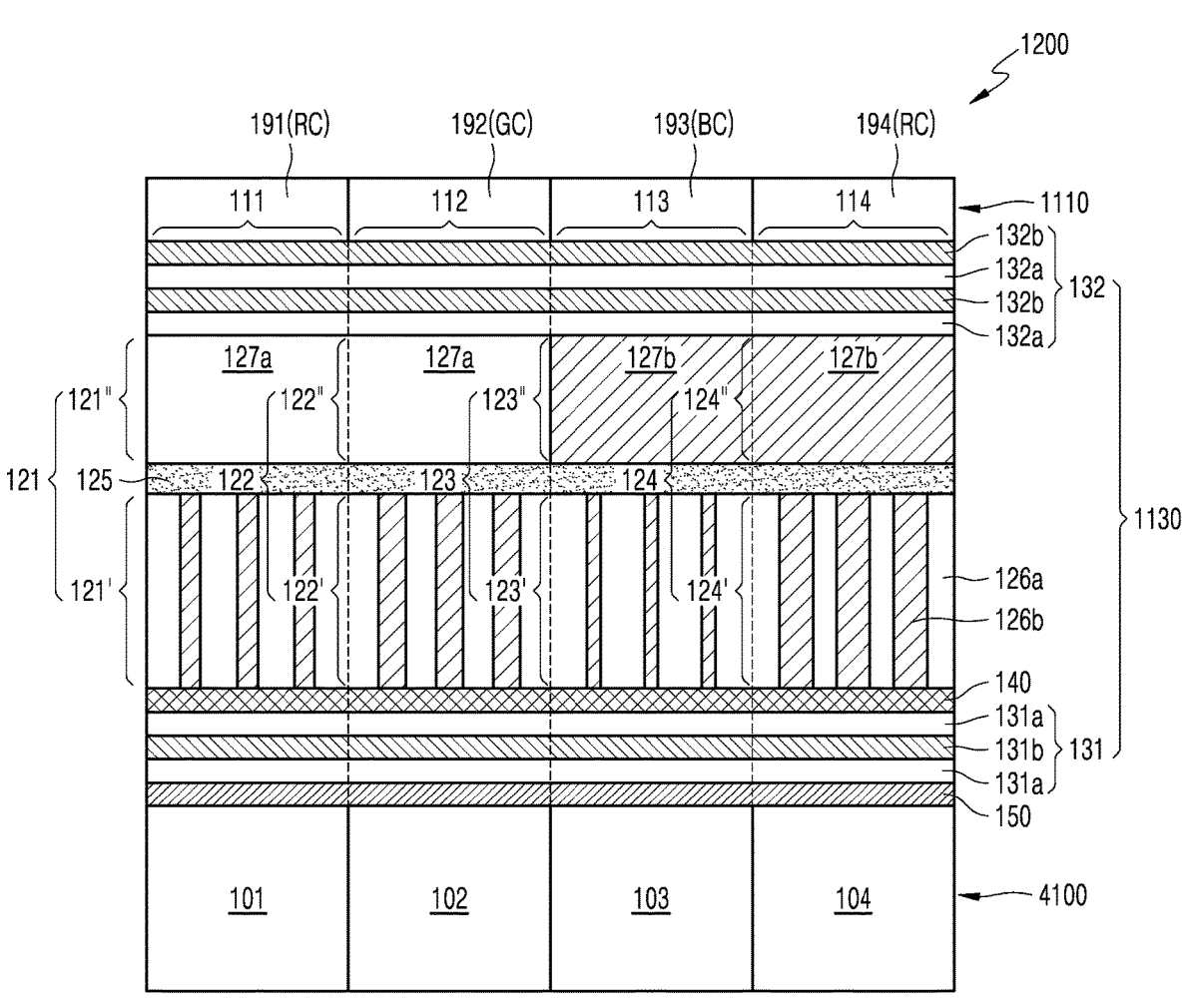
FIG. 10 illustrates a spectral filter according to another embodiment.

FIG. 10 is a cross-sectional view of a spectral filter 1200 according to another embodiment. Hereinafter, differences from the above-described embodiment are mainly described.

Referring to FIG. 10, the spectral filter 1100 includes a first filter array 1110 and a second filter array 1130 disposed on the first filter array 1110. FIG. 10 illustrates that the second filter array 1130 is provided below the first filter array 1110 but the second filter array 1130 is provided above the first filter array 1110. The first filter array 1110 may include the plurality of band filters 191, 192, 193, and 194 arranged in a 2D form. The second filter array 1130 includes the plurality of unit filters 111, 112, 113, and 114 in a one-to-one correspondence with the plurality of band filters 191, 192, 193, and 194.

The first, second, third, and fourth unit filters 111, 112, 113, and 114 may include the first and second reflecting plates 131 and 132 spaced apart from each other and first, second, third and fourth cavities 121, 122, 123 and 124 provided between the first and second reflecting plates 131 and 132. Each of the first, second, third, and fourth cavities 121, 122, 123, and 124 may have central wavelengths of different bands in a visible light region (a wavelength range of about 400 nm to about 700 nm).

The first, second, third, and fourth cavities 121, 122, 123, and 124 may respectively include the first, second, third, and fourth cavity lower layers 121', 122', 123', and 124', the first, second, third, and fourth cavity upper layers 121", 122", 123", and 124" and the dielectric separation layer 12 provided between the first, second, third, and fourth cavity lower layers 121', 122', 123', and 124', and the first, second, third, and fourth cavity upper layers 121", 122", 123", and 124".

The first cavity 121 may include the first cavity lower layer 121', the dielectric separation layer 125, and the first cavity upper layer 121", and the second cavity 122 includes the second cavity lower layer 122", the dielectric separation layer 125, and the second cavity upper layer 122". The third cavity 123 may include the third cavity lower layer 123', the dielectric separation layer 125, and the third cavity upper layer 123", and the fourth cavity 124 123 includes the fourth cavity lower layer 124', the dielectric separation layer 125, and the fourth cavity upper layer 124".

Each of the first, second, third, and fourth cavities 121, 122, 123, and 124 may include a certain dielectric pattern. The dielectric pattern of each of the first, second, third, and fourth cavities 121, 122, 123, and 124 may include a lower dielectric pattern of each of the first, second, third, and fourth cavity lower layers 121', 122', 123', and 124' and an upper dielectric pattern of each of the first, second, third, and fourth cavity upper layers 121", 122", 123", and 124". FIG. 10 illustrates an example in which a lower dielectric pattern and an upper dielectric pattern thereon are different from each other.

Each of the first, second, third, and fourth cavity lower layers 121', 122', 123', and 124' may include the first dielectric 126a and the second dielectric 126b disposed on the first dielectric 126a. Each of the first, second, third, and fourth cavity lower layers 121', 122', 123', and 124' may have various lower dielectric patterns according to materials, shapes, sizes, and arrangements of the first and second dielectrics 126a and 126b. The effective refractive index of each of the first, second, third, and fourth cavities 121, 122, 123, and 124 may be adjusted by changing a volume ratio occupied by the first and second dielectrics 126a and 126b in each of the first, second, third, and fourth cavity lower layers 121', 122', 123', and 124'.

Each of the first, second, third, and fourth cavity upper layers 121", 122", 123", and 124" may include a dielectric. Specifically, each of the first and second cavity upper layers 121" and 122" may include the third dielectric 127a and each of the third and fourth cavity upper layers 123" and 124" may include the fourth dielectric 127b. The fourth dielectric 127b may have a refractive index higher than that of the third dielectric 127a. Each of the first, second, third, and fourth cavity upper layers 121", 122", 123", and 124" may include a dielectric, and thus, compared to the first, second, third, and fourth cavity lower layers 121', 122', 123', and 124', the effective refractive index of each of the first, second, third, and fourth cavities 121, 122, 123, and 124 may be relatively greatly adjusted.

Figure 11A:
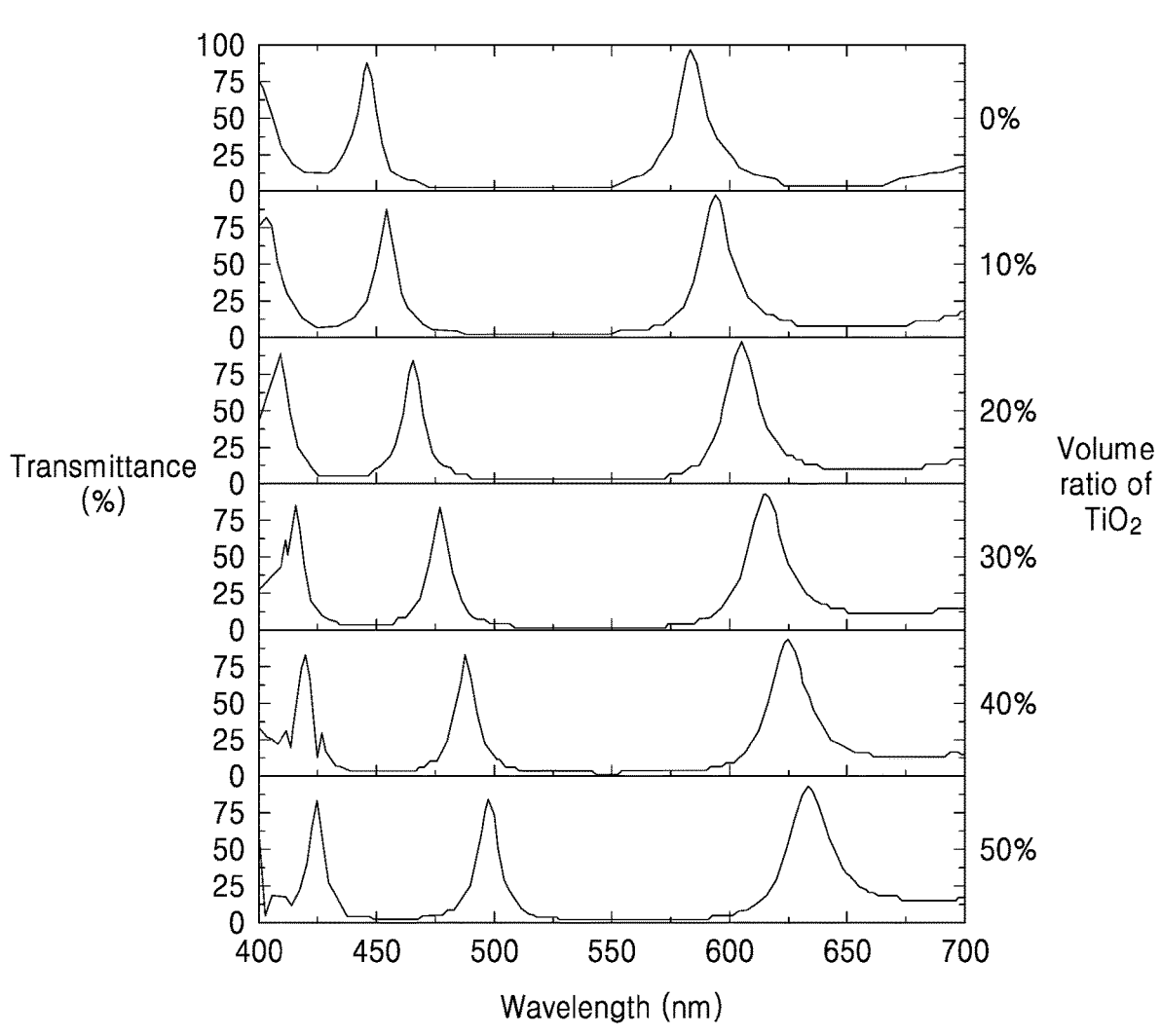
FIGS. 11A and 11B illustrate simulation results showing transmission spectrums of unit filters shown in FIG. 10.
Figure 11B:
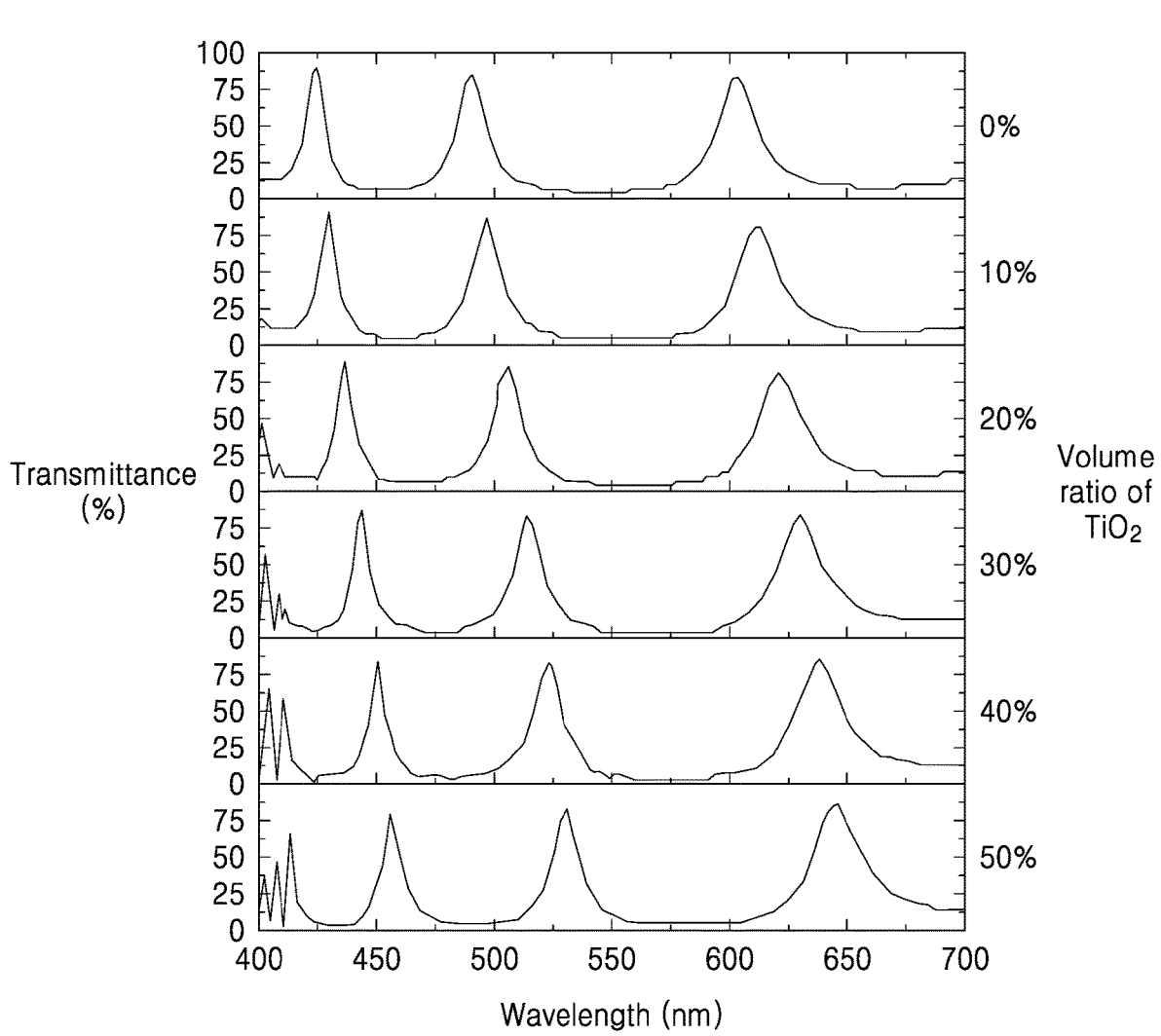

FIGS. 11A and 11B are simulation results showing transmission spectrums of the unit filters 111, 112, 113, and 114 shown in FIG. 10. Specifically, FIG. 11A shows transmission spectrums of the first and second unit filters 111 and 112 shown in FIG. 10, and FIG. 11B shows transmission spectrums of the third and fourth unit filters 113 and 114 shown in FIG. 10. Here, the first and third dielectrics 126a and 127a include silicon oxide ($SiO_2$), and the second and fourth dielectrics 126b and 127b include titanium oxide ($TiO_2$). The first, second, third, and fourth cavity lower layers 121', 122', 123', and 124' are formed to a thickness of 200 nm, and the first, second, third, and fourth cavity upper layers 121", 122", 123", and 124" are formed to a thickness of 80 nm.

As in the first and second cavities 121 and 122, FIG. 11A shows transmission spectrums when the first and second cavity upper layers 121" and 122" include silicon oxide, and a volume ratio of titanium oxide is 0%, 10%, 20%, 30%, 40%, and 50% in the first and second cavity lower layers 121' and 122'. Referring to FIG. 11A, it may be seen that the central wavelengths of each of the first and second cavities 121 and 122 gradually increase as the volume ratio of titanium oxide increases.

As in the third and fourth cavities 123 and 124, FIG. 11B shows transmission spectrums when the third and fourth cavity upper layers 123" and 124" include titanium oxide, and a volume ratio of titanium oxide is 0%, 10%, 20%, 30%, 40%, and 50% in the third and fourth cavity lower layers 123' and 124'. Referring to FIG. 11B, it may be seen that the central wavelengths of each of the third and fourth cavities 123 and 124 gradually increase as the volume ratio of titanium oxide increases. In addition, it may be seen that as the third and fourth cavity upper layers 123" and 124" include titanium oxide, transmission spectrums having different central wavelengths from those of FIG. 11A (when the first and second cavity upper layers 121" and 122" include silicon oxide) are obtained.

Figure 12A:
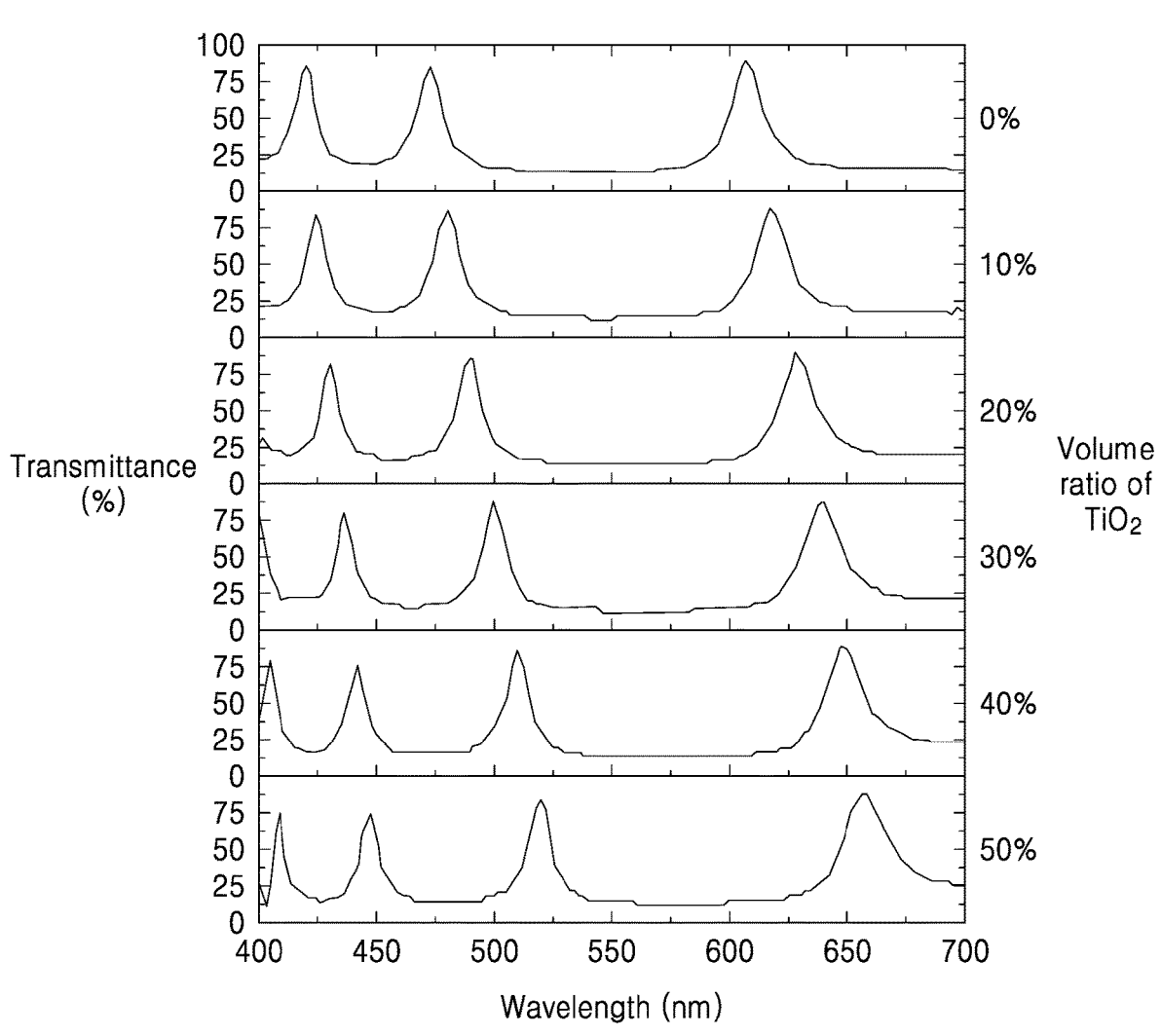
FIGS. 12A and 12B illustrate simulation results showing other transmission spectrums of the unit filters shown in FIG. 10.
Figure 12B:
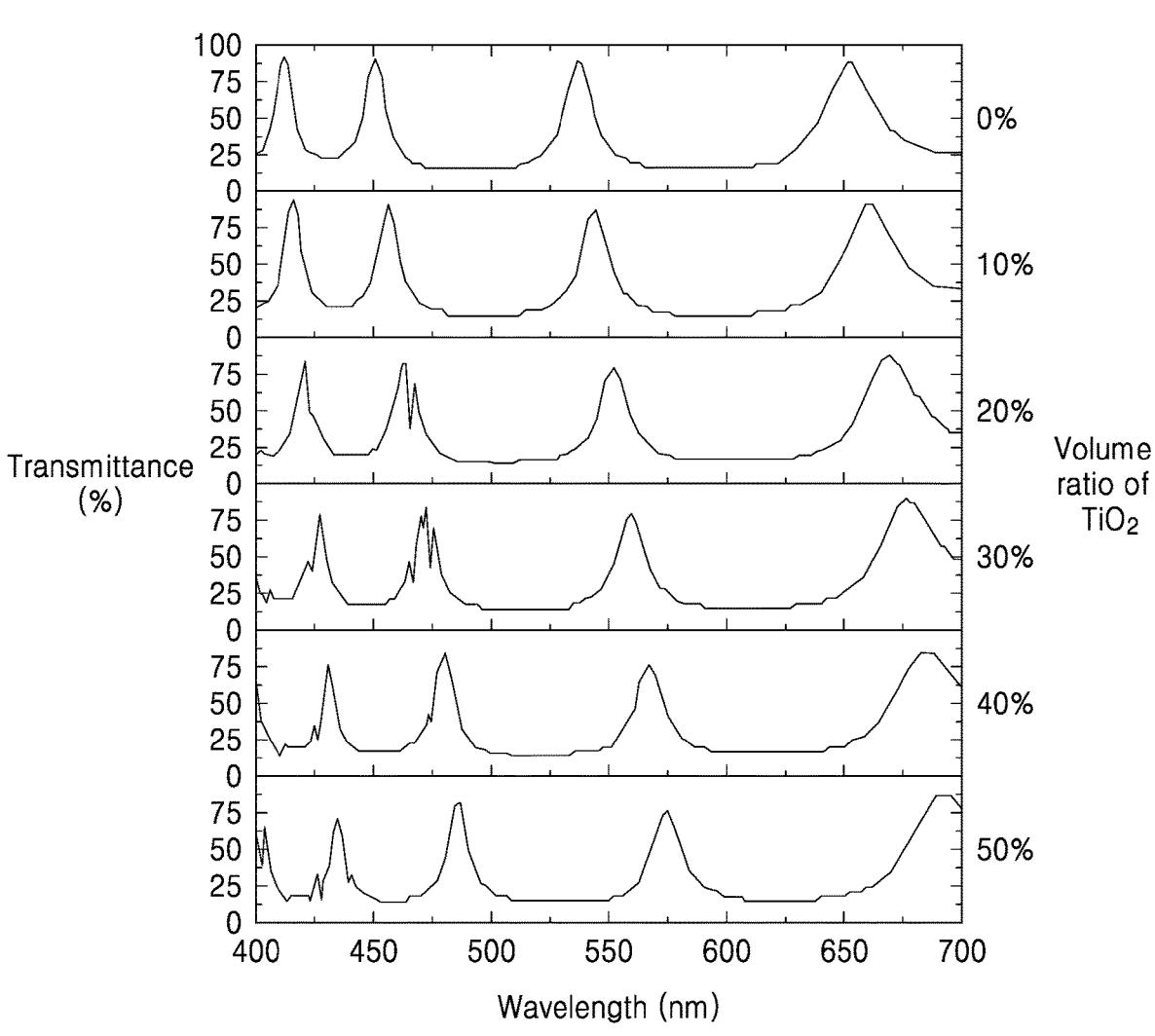

FIGS. 12A and 12B are simulation results showing other transmission spectrums of the unit filters 111,112,113, and 114 shown in FIG. 10. Specifically, FIG. 12A shows transmission spectrums of the first and second unit filters 111 and 112, and FIG. 12B shows transmission spectrums of the third and fourth unit filters 113 and 114. The first and third dielectrics 126a and 127a include silicon oxide ($SiO_2$), and the second and fourth dielectrics 126b and 127b include titanium oxide ($TiO_2$). The first, second, third, and fourth cavity lower layers 121', 122', 123', and 124' are formed to a thickness of 200 nm, and the first, second, third, and fourth cavity upper layers 121", 122", 123", and 124" are formed to a thickness of 130 nm.

As in the first and second cavities 121 and 122, FIG. 12A shows transmission spectrums when the first and second cavity upper layers 121" and 122" include silicon oxide, and a volume ratio of titanium oxide is 0%, 10%, 20%, 30%, 40%, and 50% in the first and second cavity lower layers 121' and 122'. Referring to FIG. 12A, it may be seen that the central wavelengths of each of the first and second cavities 121 and 122 gradually increase as the volume ratio of titanium oxide increases. In addition, it may be seen that as the first and second cavity upper layers 121" and 122" are formed to a thickness of 130 nm, transmission spectrums having different central wavelengths from those of FIG. 11A (when the first and second cavity upper layers 121" and 122" are formed to a thickness of 80 nm) are obtained.

As in the third and fourth cavities 123 and 124, FIG. 12B shows transmission spectrums when the third and fourth cavity upper layers 123" and 124" include titanium oxide, and a volume ratio of titanium oxide is 0%, 10%, 20%, 30%, 40%, and 50% in the third and fourth cavity lower layers 123' and 124'. Referring to FIG. 12B, it may be seen that the central wavelengths of each of the third and fourth cavities 123 and 124 gradually increase as the volume ratio of titanium oxide increases. In addition, it may be seen that as the third and fourth cavity upper layers 123" and 124" include titanium oxide, transmission spectrums having different central wavelengths from those of FIG. 12A (when the first and second cavity upper layers 121" and 122" include silicon oxide) are obtained. In addition, it may be seen that as the third and fourth cavity upper layers 123" and 124" are formed to a thickness of 130 nm, transmission spectrums having different central wavelengths from those of FIG. 11B (when the third and fourth cavity upper layers 123" and 124" are formed to a thickness of 80 nm) are obtained.

As described above, transmission spectrums having central wavelengths of each band in a visible light range may be obtained by adjusting the thickness and the effective refractive index of each of the first, second, third, and fourth cavity lower layers 121', 122', 123', and 124' and the first, second, third, and fourth cavity upper layers 121", 122", 123", and 124".

Figure 13:
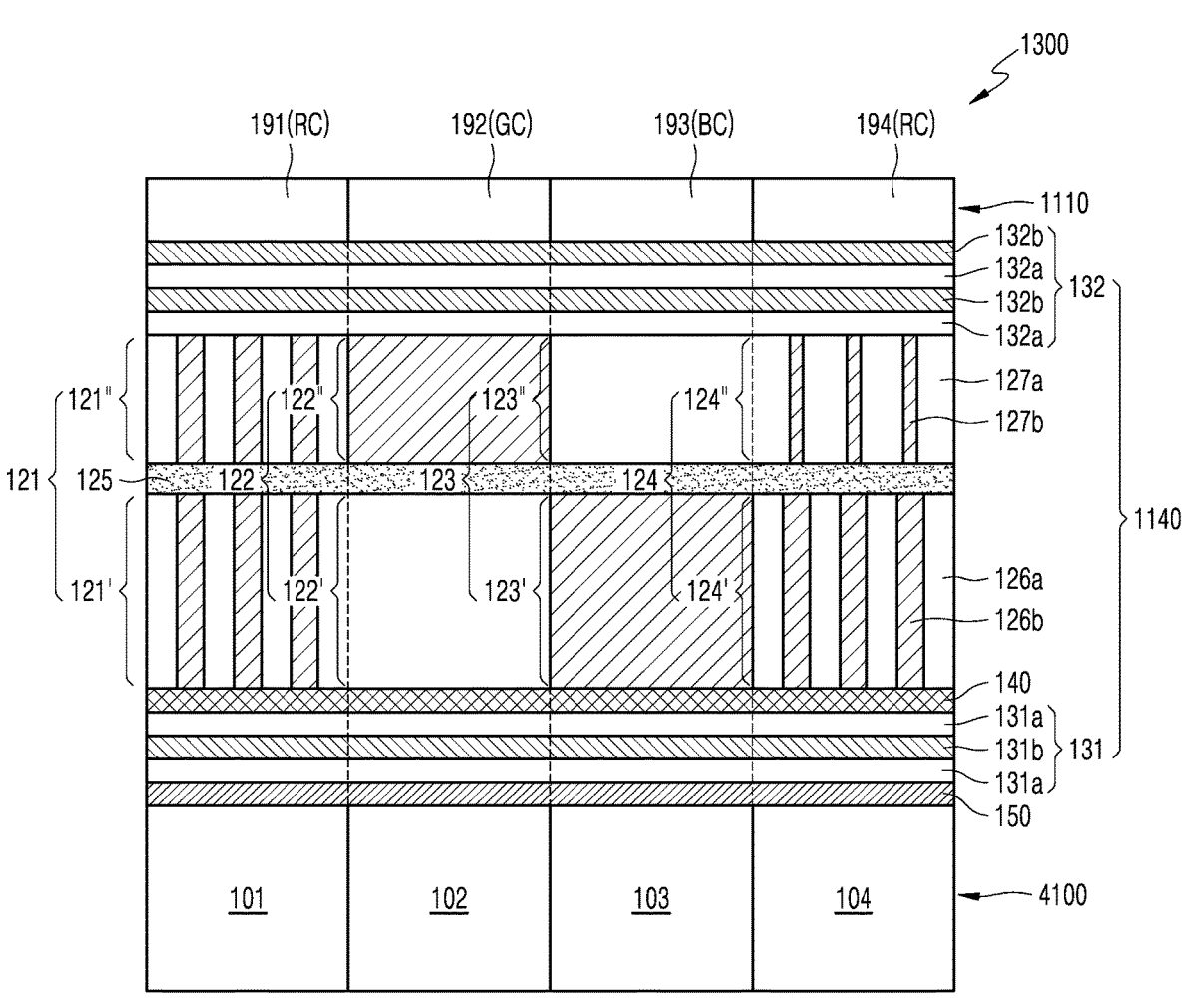
FIG. 13 illustrates a spectral filter according to another embodiment.

FIG. 13 is a cross-sectional view of a spectral filter 1300 according to another embodiment.

Referring to FIG. 13, the spectral filter 1100 may include the first filter array 1110 and a second filter array 1140 disposed on the first filter array 1110. FIG. 13 illustrates that the second filter array 1140 is disposed below the first filter array 1110, but the second filter array 1140 may be disposed above the first filter array 1110. The first filter array 1110 may include the plurality of band filters 191, 192, 193, and 194 arranged in a 2D form. The second filter array 1140 may include the plurality of unit filters 111, 112, 113, and 114 in a one-to-one correspondence with the plurality of band filters 191, 192, 193, and 194.

The first, second, third, and fourth unit filters 111, 112, 113, and 114 may include first and second reflecting plates 131 and 132 spaced apart from each other and the first, second, third and fourth cavities 121, 122, 123 and 124 provided between the first and second reflecting plates 131 and 132. The first, second, third, and fourth cavities 121, 122, 123, and 124 may respectively include the first, second, third, and fourth cavity lower layers 121', 122', 123', and 124', the first, second, third, and fourth cavity upper layers 121", 122", 123", and 124", and the dielectric separation layer 125.

Each of the first, second, third, and fourth cavities 121, 122, 123, and 124 may include a certain dielectric pattern. Each of the first cavity lower layers 121' and the first cavity upper layer 121" of the first cavity 121 may include two dielectrics having different refractive indices. Specifically, the first cavity lower layers 121' may include the first dielectric 126a and the second dielectric 126b disposed in the first dielectric 126a, and the first cavity upper layer 121" may include the third dielectric 127a and the fourth dielectric 127b disposed in the third dielectric 127a. The first cavity lower layers 121' and the first cavity upper layer 121" may include the same dielectric pattern or different dielectric patterns. FIG. 13 shows an example in which the first cavity lower layers 121' and the first cavity upper layer 121" include the same dielectric pattern Each of the second cavity lower layers 122' and the second cavity upper layer 122" of the second cavity 122 may include one dielectric. Specifically, the second cavity lower layers 122' may include the first dielectric 126a, and the second cavity upper layer 122" may include the fourth dielectric 127b. Each of the third cavity lower layers 123' and the third cavity upper layer 123" of the third cavity 123 may include one dielectric. Specifically, the third cavity lower layers 123' may include the second dielectric 126b, and the third cavity upper layer 123" may include the third dielectric 127a.

Each of the fourth cavity lower layers 124' and the fourth cavity upper layer 124" of the fourth cavity 124 may include two dielectrics having different refractive indices. Specifically, the fourth cavity lower layers 124' may include the first dielectric 126a and the second dielectric 126b disposed in the first dielectric 126a, and the fourth cavity upper layer 124" may include the third dielectric 127a and the fourth dielectric 127b disposed in the third dielectric 127a. The fourth cavity lower layers 124' and the fourth cavity upper layer 124" may include the same dielectric pattern or different dielectric patterns. FIG. 13 shows an example in which the fourth cavity lower layers 124' and the fourth cavity upper layer 124" include different dielectric patterns.

Figure 14:
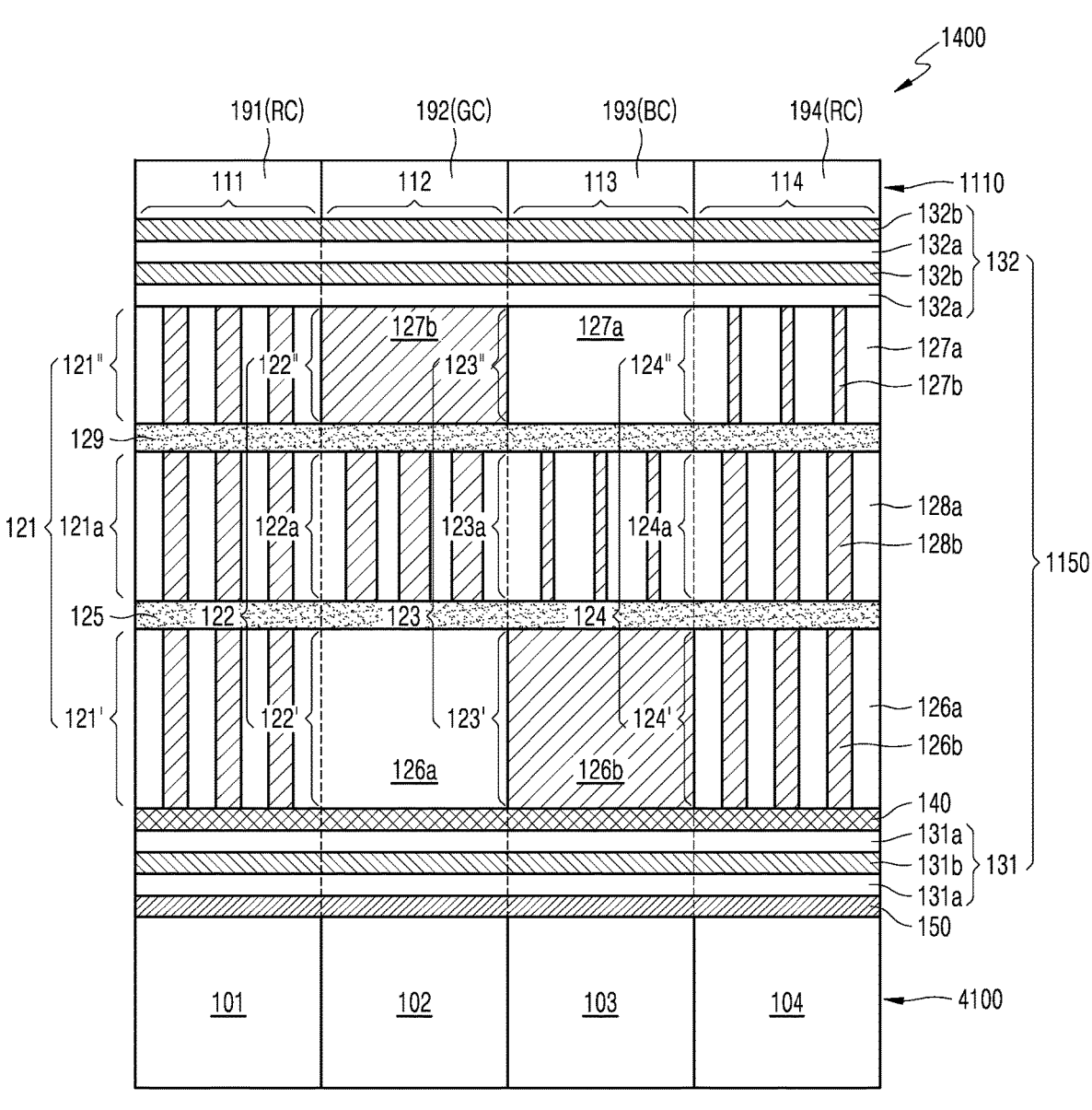
FIG. 14 illustrates a spectral filter according to another embodiment.

FIG. 14 is a cross-sectional view of a spectral filter 1400 according to another embodiment. The spectral filter 1400 shown in FIG. 14 may be the same as the spectral filter 1300 shown in FIG. 13 except that the first, second, third, and fourth cavities 121, 122, 123, and 124 may respectively further include first, second, third, and fourth cavity intermediate layers 121a, 122a, 123a, and 124a. Hereinafter, differences from the above-described embodiment are mainly described.

Referring to FIG. 14, the spectral filter 1400 may include the first filter array 1110 and a second filter array 1150 disposed on the first filter array 1110. FIG. 14 illustrates that the second filter array 1150 is provided below the first filter array 1110 but the second filter array 1150 may be provided above the first filter array 1110. The first filter array 1110 may include the plurality of band filters 191, 192, 193, and 194 arranged in a 2D form. The second filter array 1150 includes the plurality of unit filters 111, 112, 113, and 114 in a one-to-one correspondence with the plurality of band filters 191, 192, 193, and 194.

The first, second, third, and fourth unit filters 111, 112, 113, and 114 may include the first and second reflecting plates 131 and 132 spaced apart from each other and the first, second, third and fourth cavities 121, 122, 123 and 124. The first, second, third, and fourth cavities 121, 122, 123, and 124 may respectively include the first, second, third, and fourth cavity lower layers 121', 122', 123', and 124', the first, second, third, and fourth cavity upper layers 121", 122", 123", and 124", and the first, second, third, and fourth cavity intermediate layers 121a, 122a, 123a, and 124a.

Each of the first, second, third, and fourth cavity intermediate layers 121a, 122a, 123a, and 124a may include one or more dielectrics. FIG. 14 shows an example in which each of the first, second, third, and fourth cavity intermediate layers 121a, 122a, 123a, and 124a includes a fifth dielectric and a sixth dielectric disposed in the fifth dielectric.

The dielectric separation layer 125 may be provided between the first, second, third, and fourth cavity lower layers 121', 122', 123', and 124' and the first, second, third, and fourth cavity intermediate layers 121a, 122a, 123a, and 124a Since the dielectric separation layer 125 has been described above, and thus, a description thereof is omitted. An additional dielectric separation layer 129 may be provided between the first, second, third, and fourth cavity intermediate layers 121a, 122a, 123a, and 124a and the first, second, third, and fourth cavity upper layers 121", 122", 123", and 124". The additional dielectric separation layer 129 and the dielectric separation layer 125 are the same in the configuration and function. An example in which each of the first, second, third, and fourth cavities 121, 122, 123, and 124 includes three pattern layers has been described above. However, the inventive concept is not limited thereto, each of the first, second, third, and fourth cavities 121, 122, 123, and 124 includes four pattern layers, and in this case, a dielectric separation layer may be provided between adjacent pattern layers.

Figure 15:
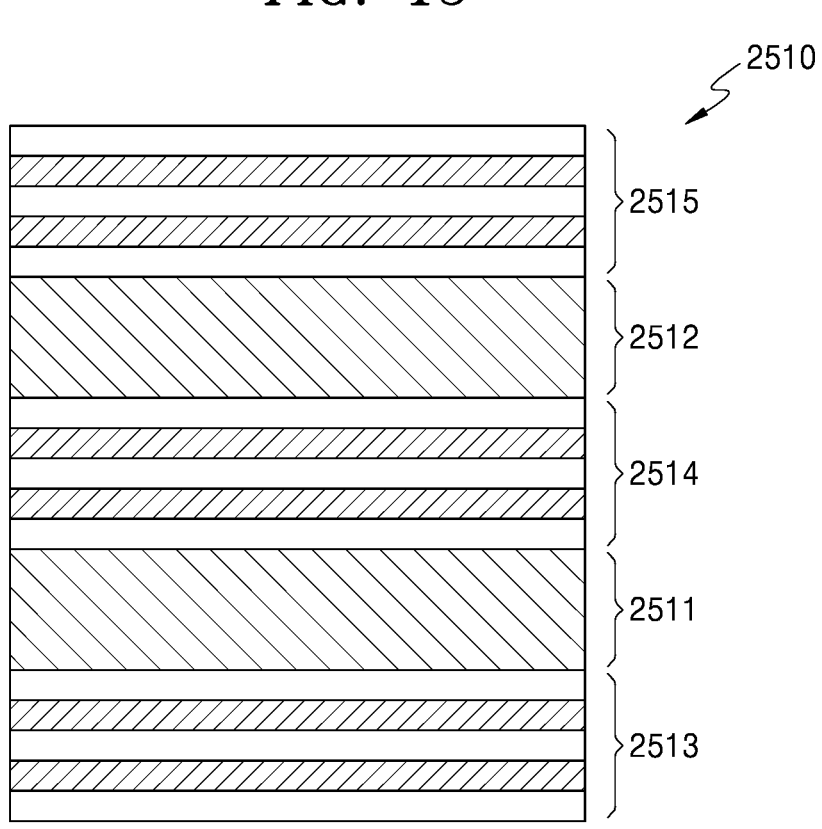
FIG. 15 illustrates an example of a broadband filter that may be applied to a first filter array of a spectral filter according to an embodiment.

FIG. 15 illustrates an example of a broadband filter that may be applied to a first filter array of a spectral filter according to an embodiment.

Referring to FIG. 15, a broadband filter 2510 may include a plurality of reflective layers 2513, 2514, and 2515 spaced apart from each other, and a plurality of cavities 2511 and 2512 provided between the reflective layers 2513, 2514, and 2515. The three reflective layers 2513, 2514, and 2515 and the two cavities 2511 and 2512 are shown in FIG. but the number of reflective layers 2513, 2514, 2515 and the cavities 2511 and 2512 may be modified in various ways.

Each of the reflective layers 2513, 2514, and 2515 may be a DBR. Each of the reflective layers 2513, 2514, and 2515 may have a structure in which a plurality of material layers having different refractive indices are alternately stacked.

Also, each of the cavities 2511 and 2512 may include a material having a certain refractive index or two or more materials having different refractive indices.

Figure 16:
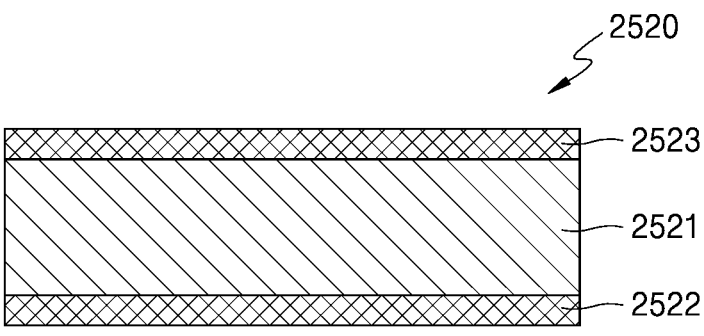
FIG. 16 illustrates another example of a broadband filter that may be applied to a first filter array of a spectral filter according to an embodiment.

FIG. 16 illustrates another example of a broadband filter that may be applied to the first filter array of a spectral filter according to an embodiment.

Referring to FIG. 16, a broadband filter 2520 may include two metal mirror layers 2522 and 2523 spaced apart from each other, and a cavity 2521 provided between the metal mirror layers 2522 and 2523.

Figure 17:
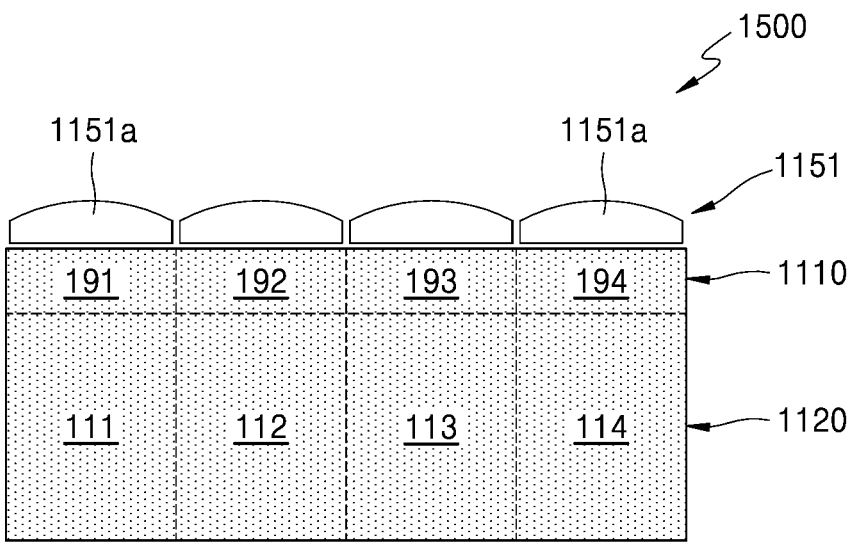
FIG. 17 is a cross-sectional view of a spectral filter according to another embodiment.

FIG. 17 is a cross-sectional view of a spectral filter 1500 according to another embodiment.

Referring to FIG. 17, a micro lens array 1151 is provided above the first and second filter arrays 1110 and 1120. The first and second filter arrays 1110 and 1120 have been described above, and thus, descriptions thereof are omitted. FIG. 17 illustrates that the second filter array 1120 is disposed below the first filter array 1110, but the second filter array 1120 may be disposed above the first filter array 1110.

The micro lens array 1151 may include a plurality of micro lenses 1151a respectively corresponding to the band filters 191, 192, 193, and 194 of the first filter array 1110. Here, the micro lenses 1151a may respectively serve to focus external light to the corresponding band filters 191, 192, 193, and 194 to be incident thereto.

FIG. 17 illustrates that the micro lenses 1151a are provided in a one-to-one correspondence with the band filters 191, 192, 193, and 194, but this is an example, and two or more of the band filters 191, 192, 193, and 194 may correspond to one of the micro lens 1151a.

Figure 18:
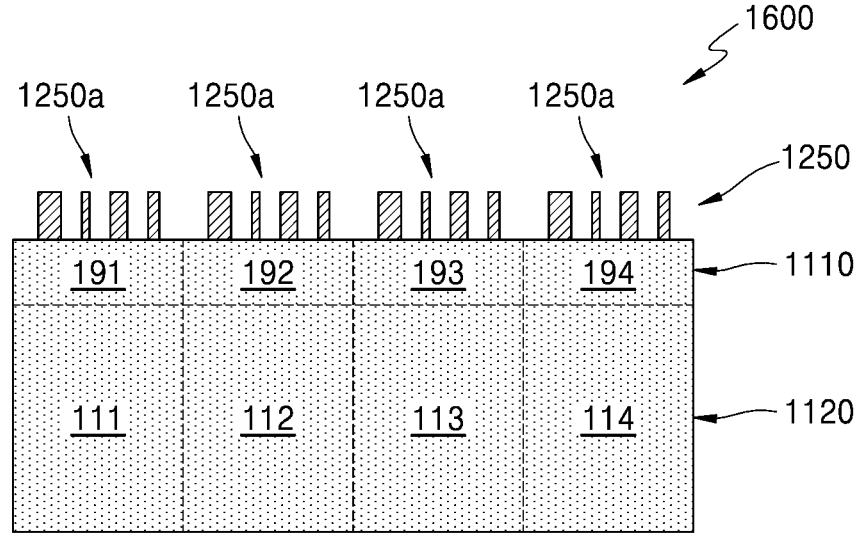
FIG. 18 is a cross-sectional view of a spectral filter according to another embodiment.

FIG. 18 is a cross-sectional view of a spectral filter 1600 according to another embodiment.

Referring to FIG. 18, a nano pattern array 1250 may be provided above the first and second filter arrays 1110 and 1120. Nano patterns 1250a may respectively serve to focus external light to the corresponding band filters 191, 192, 193, and 194 to be incident thereto. FIG. 18 illustrates that the nano patterns 1250a are provided in a one-to-one correspondence with the band filters 191, 192, 193, and 194, but this is an example, and two or more of the band filters 191, 192, 193, and 194 may correspond to one of the nano patterns 1250a. The present embodiment may be applied in the same manner when the second filter array 1120 is disposed below the first filter array 1110 as well as when the second filter array 1120 is disposed above the first filter array 1110.

Figure 19:
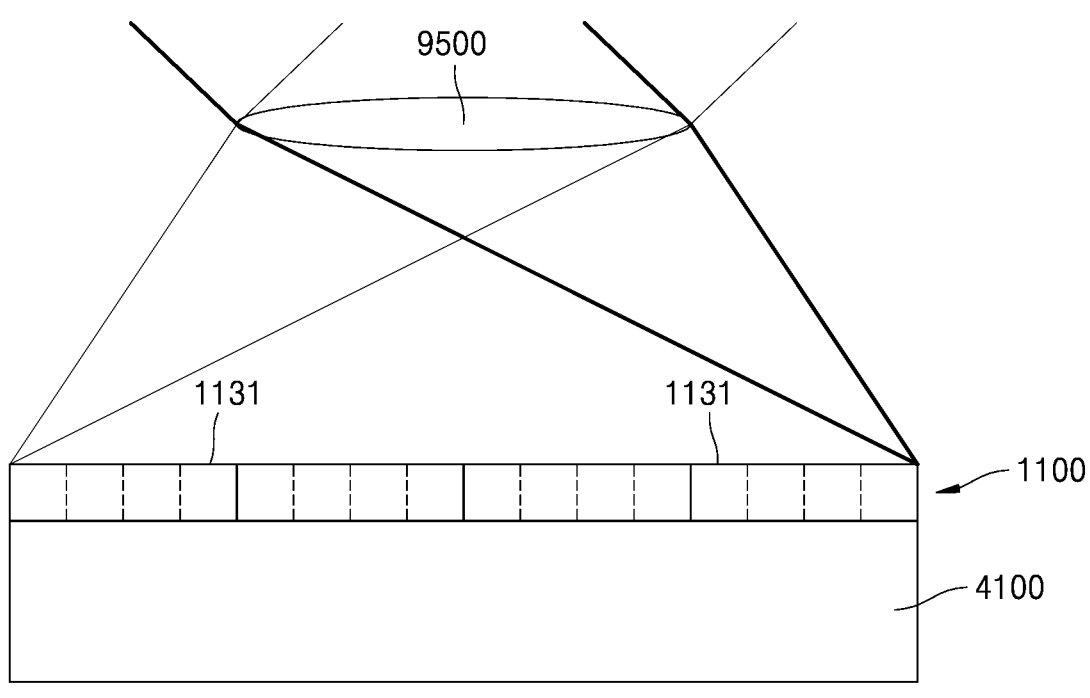
FIG. 19 is a cross-sectional view of a spectral filter according to another embodiment.

FIG. 19 illustrates an image sensor according to another embodiment.

Referring to FIG. 19, the spectral filter 1100 may be provided on a pixel array 4100, and a single imaging lens 9500 may be provided above the spectral filter 1100. Here, the spectral filter 1100 may include a plurality of channels 1131. As described above, the plurality of channels 1131 may be configured by a combination of the band filters 191, 192, 193, and 194 of the first filter array 1110 and the unit filters 111, 112, 113, and 114 of the second filter array 1120.

In this way, the single imaging lens 9500 for forming an image of an object may be provided above the spectral filter 1100, and thus, a camera capable of obtaining a spectral image may be implemented with a simple optical system.

Hereinafter, a spectral filter according to an embodiment that may compensate for a central wavelength shift caused by a change in a chief ray angle (CRA) of an incident light by changing the effective refractive index of the cavity according to the position of the unit filter of the second filter array is provided.

Figure 20:
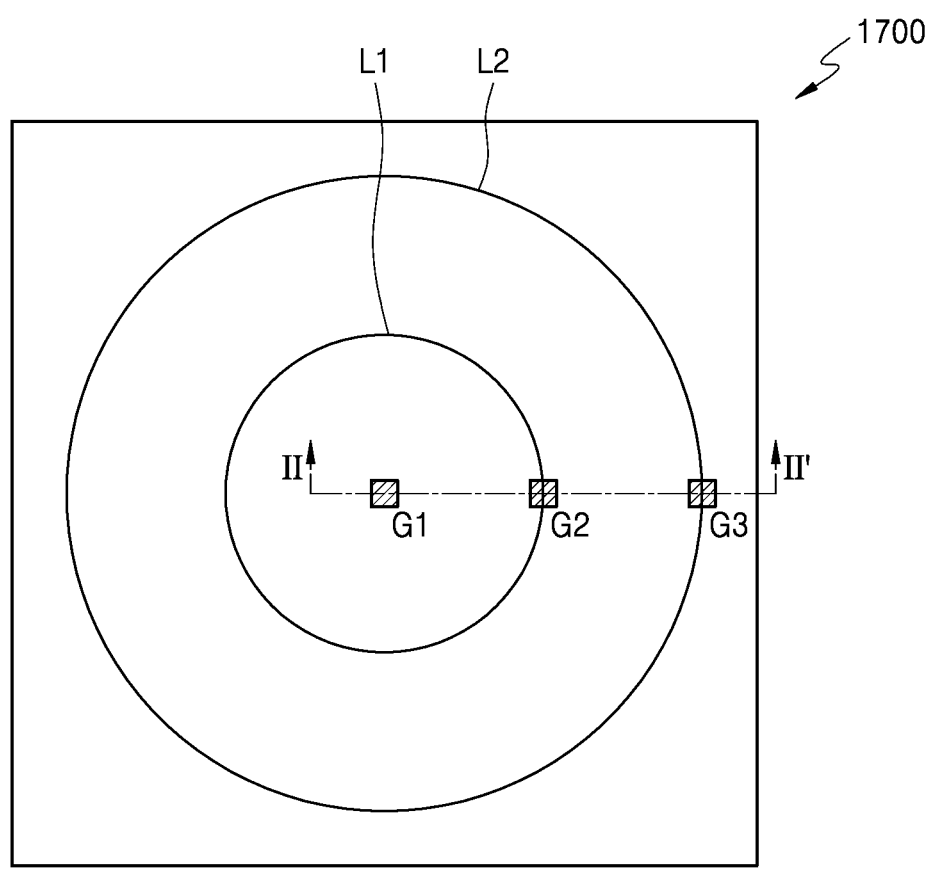
FIG. 20 is a plan view illustrating unit filters disposed at different positions in a spectral filter according to an embodiment.
Figure 21:
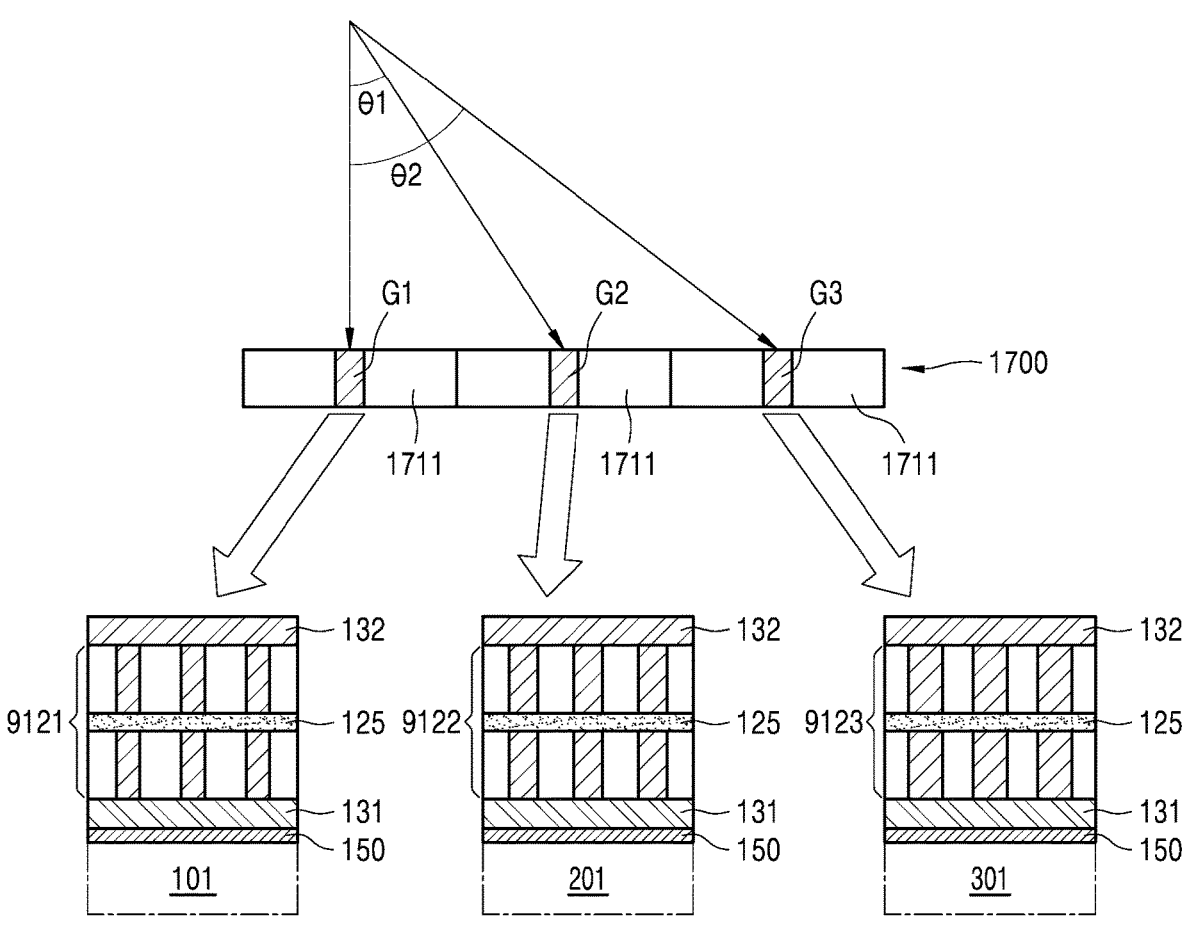
FIG. 21 is a cross-sectional view taken along line II-II' of FIG. 20.

FIG. 20 is a plan view illustrating unit filters F1, F1', and F1" disposed at different positions in a spectral filter 1700 according to an embodiment. FIG. 21 is a cross-sectional view taken along line II-II' of FIG. 20. For convenience, only the plurality of second filter arrays 1711 are shown in FIGS. 20 and 21. Here, among unit filters of each of the second filter arrays 1711 constituting the spectral filter 1700, unit filters G1, G2, and G3 having the same central wavelength and disposed at different positions are described.

In FIGS. 20 and 21, L1 may represent a circle connecting first positions where the CRA of the incident light is θ1, and L2 may represent a circle connecting second positions where the CRA of the incident light is θ2 (≥θ1). The unit filter G1 may be at the center of the spectral filter 1700 where the CRA of the incident light is 0 degree, the unit filter G2 is at a position where the CRA of the incident light is θ1, and the unit filter G3 may be at a position where the CRA of the incident light is θ2. All of the unit filters G1, G2, and G3 provided at different positions may have the same central wavelength.

Referring to FIGS. 20 and 21, as described above, each of the unit filters G1, G2, and G3 may include the first and second reflecting plates 131 and 132 spaced apart from each other, and cavities 9121, 9122, and 9123 provided between the first and second reflecting plates 131 and 132. Each of the cavities 9121, 9122, and 9123 may include a cavity lower layer, the dielectric separation layer 125, and a cavity upper layer. The first and second reflecting plates 131 and 132 and the cavities 9121, 9122, and 9123 have been described above, and thus, descriptions thereof are omitted. The pixels 101, 201, and 301 of the pixel array 4100 may be disposed below the first reflecting plate 131.

In the present embodiment, the effective refractive indices of the cavities 9121, 9122, and 9123 (more specifically, at least one of the cavity lower layer or the cavity upper layer) may be adjusted according to the positions of the unit filters G1, G2, and G3 so as to compensate for the central wavelength shift caused by the change in the CRA of the incident light. Specifically, the effective refractive indices of the cavities 9121, 9122, and 9123 may be changed by changing a dielectric pattern of at least one of cavity lower layers and cavity upper layers according to the positions of the unit filters G1, G2, and G3. Here, the effective refractive indices of the cavities 9121, 9122, and 9123 may be adjusted to an extent of compensating for the central wavelength shift generated according to the CRA of the incident light.

Figure 22:
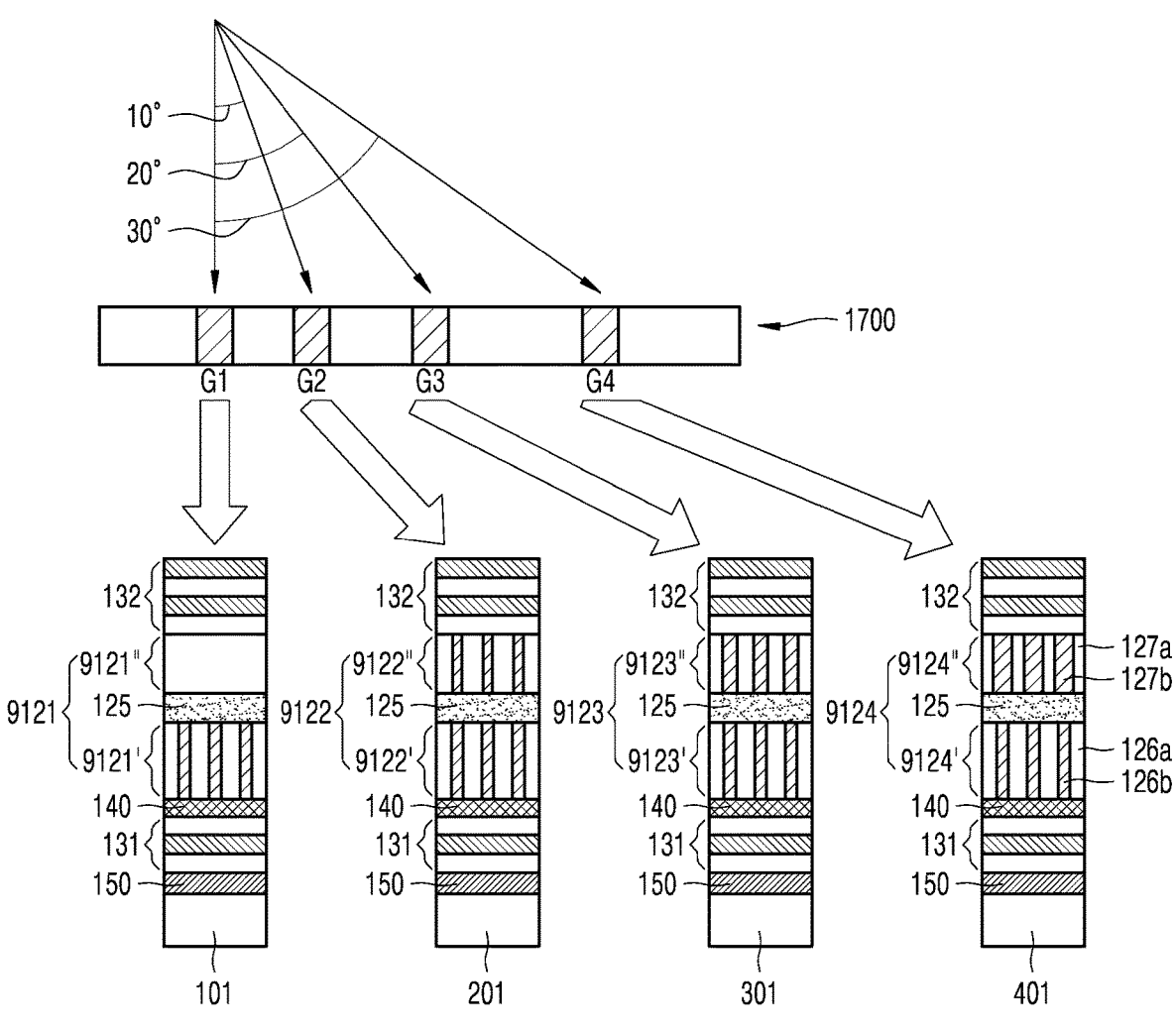
FIG. 22 is a cross-sectional view of a spectral filter according to another embodiment.

FIG. 22 is a cross-sectional view of the spectral filter 1700 according to another embodiment. In FIG. 22, unit filters G1, G2, G3, and G4 have the same central wavelength and are disposed at different positions among unit filters of each of second filter arrays constituting the spectral filter 1700.

Referring to FIG. 22, cavity lower layers 9121', 9122', 9123', and 9124' may include the same dielectric pattern, and cavity upper layers 9121", 9122", 9123", and 9124" respectively may include dielectric patterns varying according to positions of the unit filters G1, G2, G3, and G4. In the cavity upper layers 9121", 9122", 9123", and 9124", a volume ratio occupied by the fourth dielectric 127b in the third dielectric 127a may change according to the positions of the unit filters G1, G2, G3, and G4.

FIG. 22 shows an example in which the unit filters G1, G2, G3, and G4 are respectively at positions where the CRA of the incident light is 0 degrees, 10 degrees, 20 degrees, and 30 degrees. Here, the volume ratio of titanium oxide forming the fourth dielectric 127b of each of the cavity upper layers 9121", 9122", 9123", and 9124" is 0%, 5%, 16%, and 32%, respectively, in the unit filters G1, G2, G3, and G4.

Figure 23A:
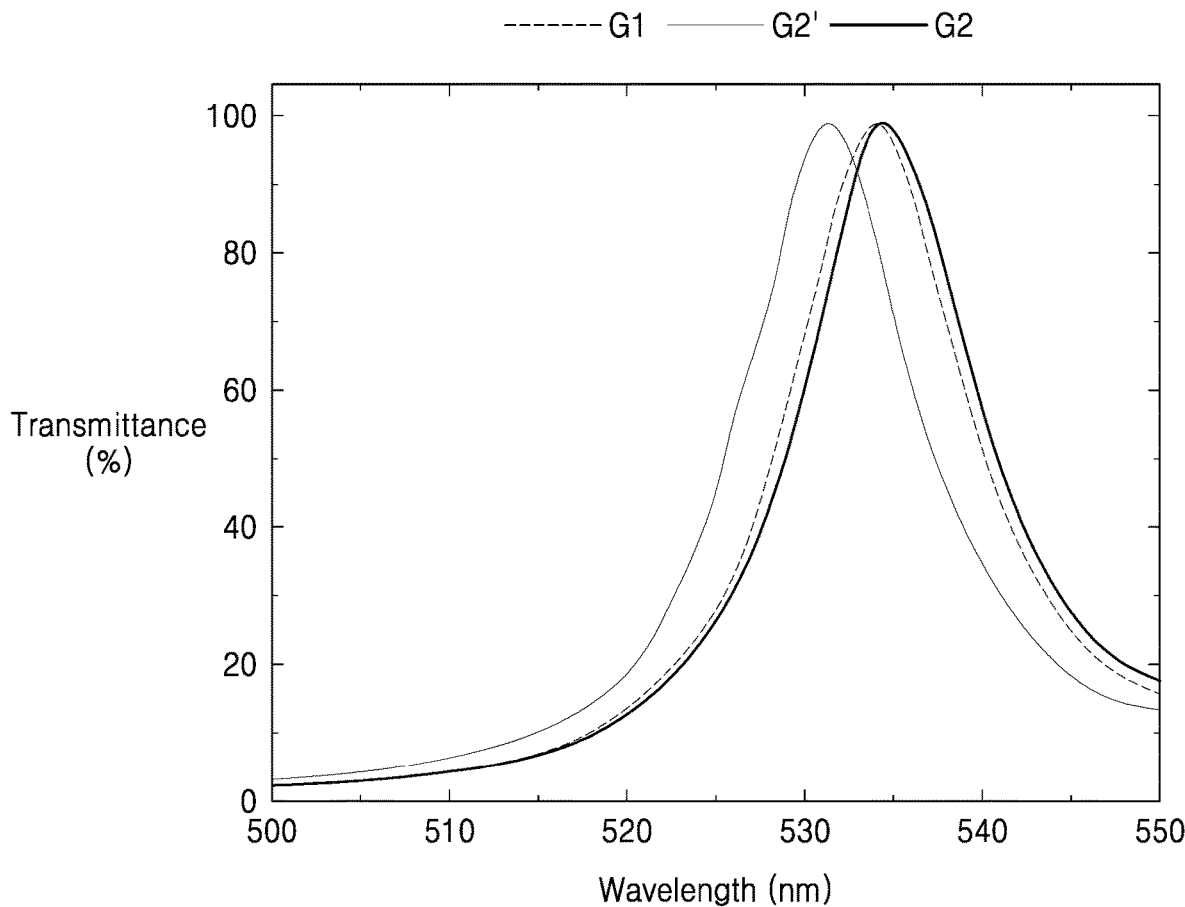
FIGS. 23A to 23C are simulation results showing transmission spectrums of unit filters shown in FIG. 23.
Figure 23B:
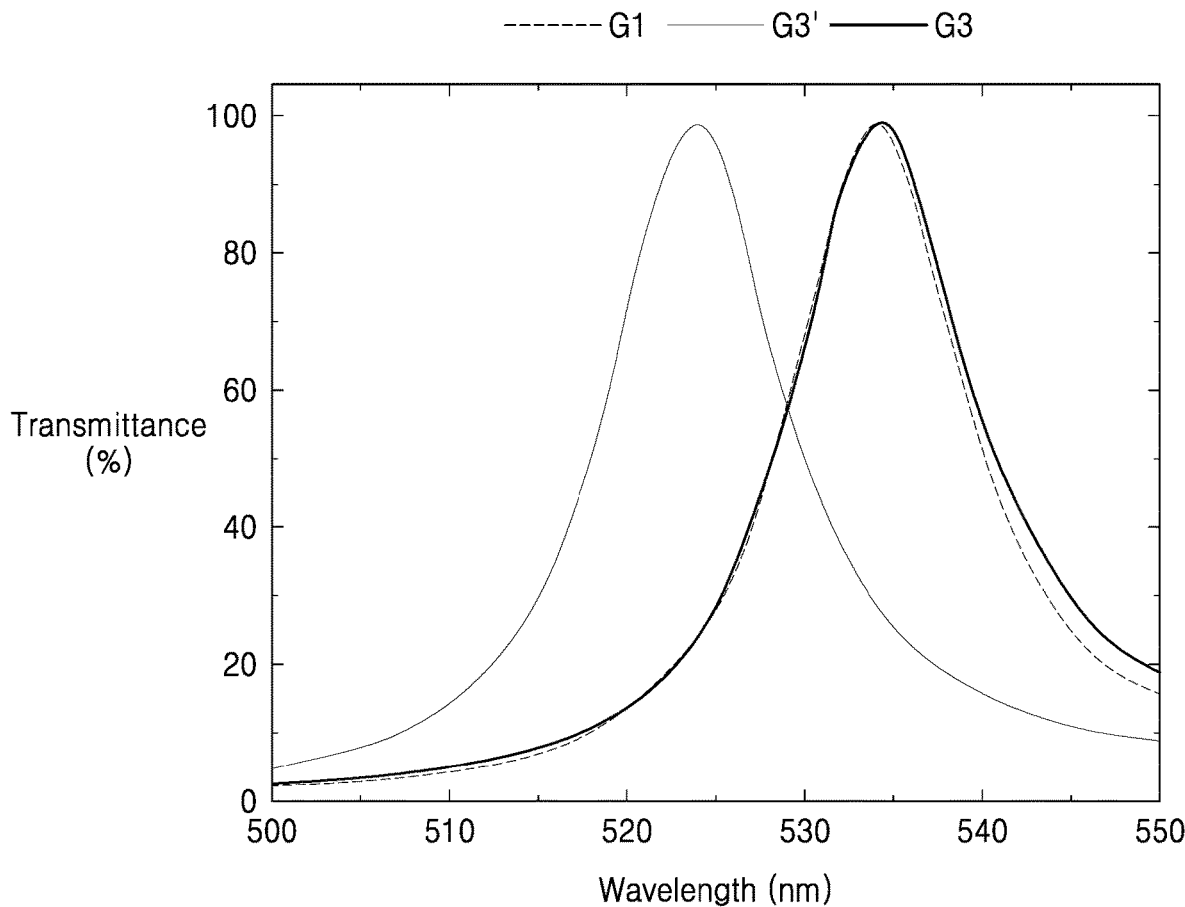
Figure 23C:
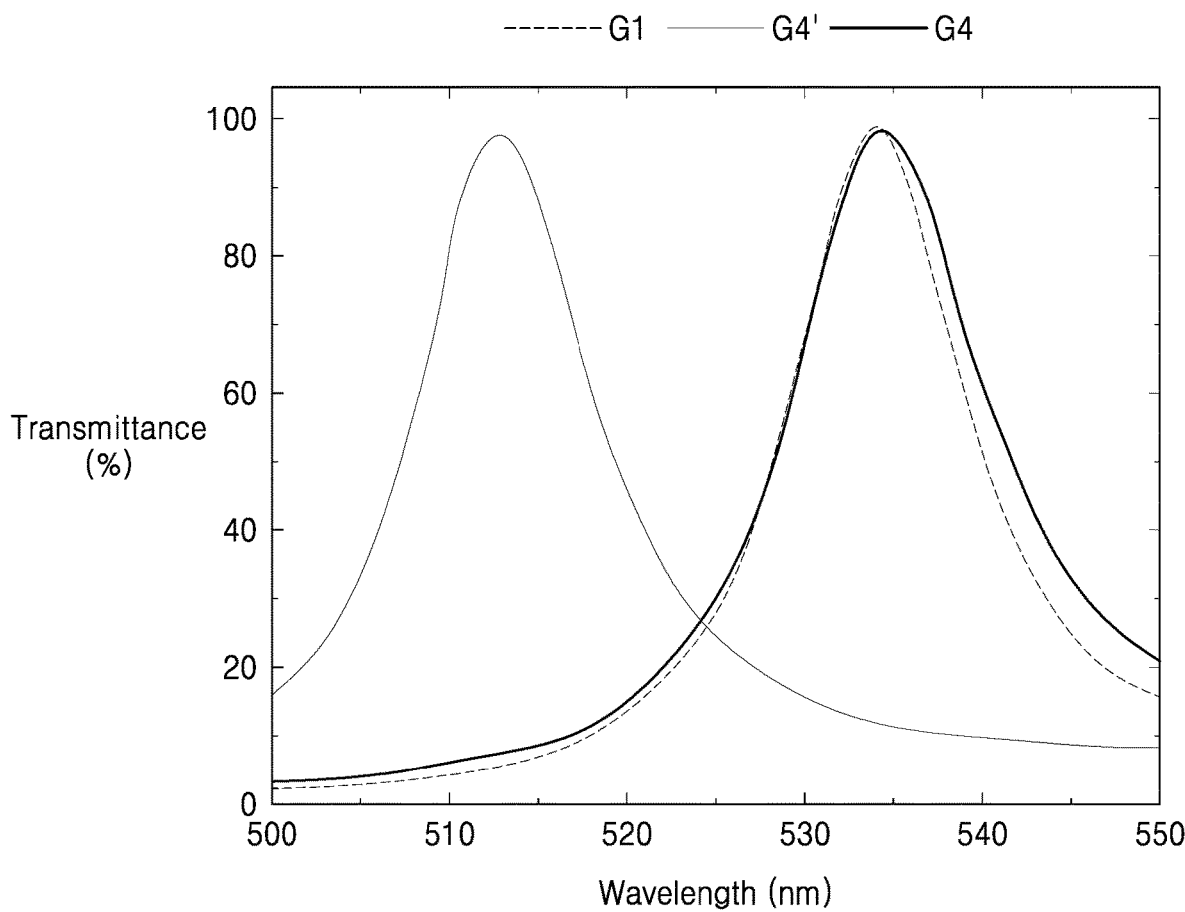

FIGS. 23A to 23C are simulation results showing transmission spectrums of unit filters shown in FIG. 23. In FIGS. 23A to 23C, "G1" denotes a transmission spectrum of the unit filter G1 at a position where the CRA of the incident light is 0 degree.

FIG. 23A shows a transmission spectrum of the unit filter G2. In FIG. 23A, "G2" may denote a transmission spectrum of the unit filter G2 at a position where the CRA of the incident light is 10 degrees, and "G2'" may denote a transmission spectrum when the unit filter G1 moves to the position where the CRA of the incident light is 10 degrees. FIG. 23B shows a transmission spectrum of the unit filter G3. In FIG. 23B, "G3" denotes a transmission spectrum of the unit filter G3 at a position where the CRA of the incident light is 20 degrees, and "G3'" may denote a transmission spectrum when the unit filter G1 moves to the position where the CRA of the incident light is 20 degrees. FIG. 23C shows a transmission spectrum of the unit filter G4. In FIG. 23C, "G4" denotes a transmission spectrum of the unit filter G4 at a position where the CRA of the incident light is 30 degrees, and "G4'" may denote a transmission spectrum when the unit filter G1 moves to the position where the CRA of the incident light is 30 degrees.

As shown in FIGS. 23A to 23C, it may be seen that a central wavelength shift occurs when the unit filter G1 in the position where the CRA of the incident light is 0 degree moves to the position where the CRA of the incident light is 10 degrees, 20 degrees, and 30 degrees, respectively.

Referring to FIG. 23A, when the unit filter G2 in which a volume ratio of titanium oxide is 5% in the cavity upper layers 9121", 9122", 9123", and 9124" is disposed at a position where the CRA of the incident light is 10 degrees, the same central wavelength as that of the unit filter G1 at the position where the CRA of the incident light is 0 degrees may be obtained. Referring to FIG. 23B, when the unit filter G3 in which a volume ratio of titanium oxide is 16% in the cavity upper layers 9121", 9122", 9123", and 9124" is disposed at a position where the CRA of the incident light is 20 degrees, the same central wavelength as that of the unit filter G1 at the position where the CRA of the incident light is 0 degrees may be obtained. Referring to FIG. 23C, when the unit filter G4 in which a volume ratio of titanium oxide is 32% in the cavity upper layers 9121", 9122", 9123", and 9124" is disposed at a position where the CRA of the incident light is 30 degrees, the same central wavelength as that of the unit filter G1 at the position where the CRA of the incident light is 0 degrees may be obtained.

As described above, the central wavelength shift occurred according to the change in the CRA of the incident light may be compensated for by changing the volume ratio of the fourth dielectric layer 127b of each of the cavity upper layers 9121", 9122", 9123", and 9124" according to the positions of the unit filters G1, G2, G3, and G4.

Figure 24:
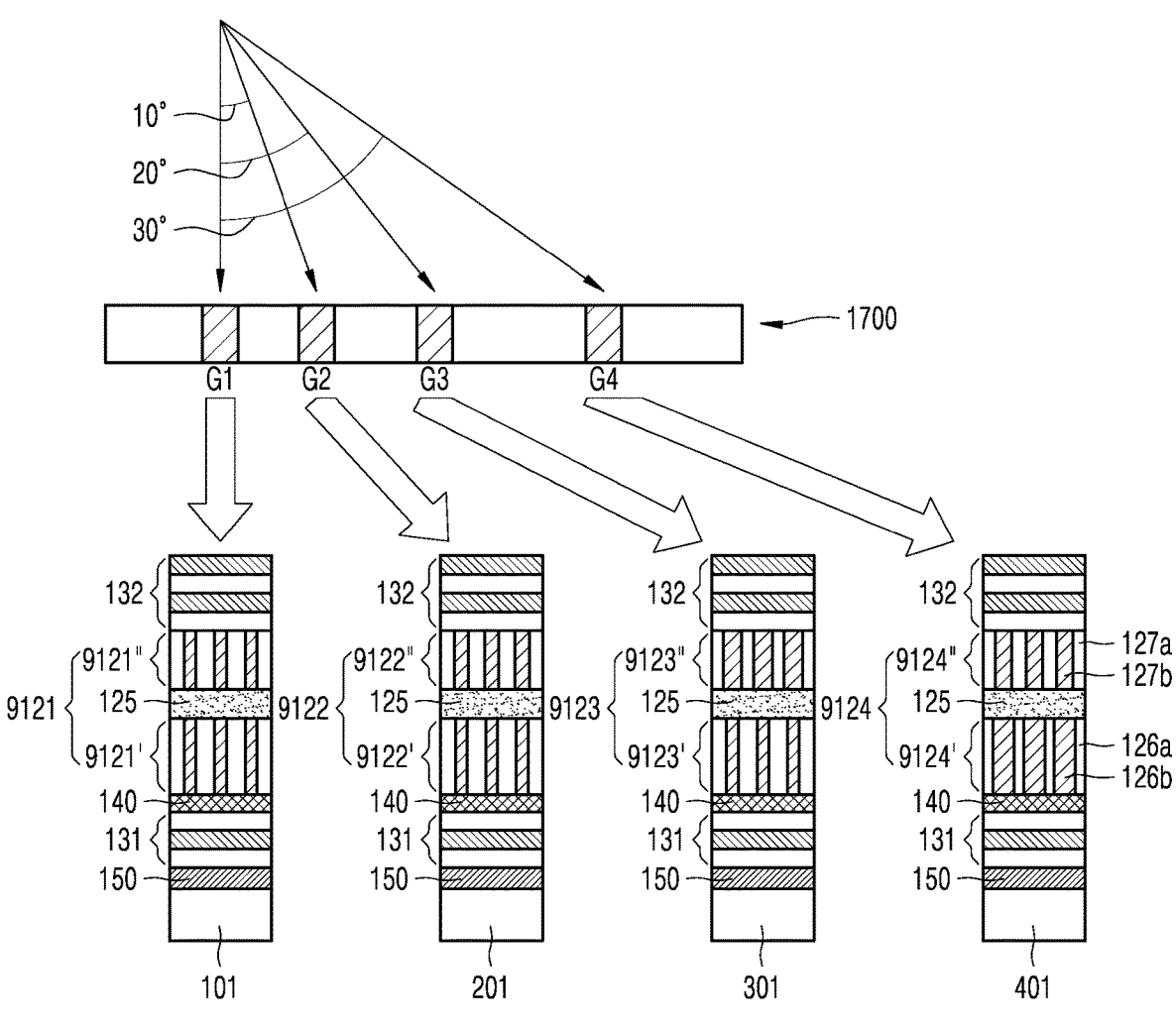
FIG. 24 is a cross-sectional view of a spectral filter according to another embodiment.

FIG. 24 is a cross-sectional view of the spectral filter 1700 according to another embodiment. In FIG. 24, unit filters G1, G2, G3, and G4 have the same central wavelength and are disposed at different positions among unit filters of each of second filter arrays constituting the spectral filter 1700.

Referring to FIG. 24, the cavity lower layers 9121', 9122', 9123', and 9124' respectively may include dielectric patterns changing according to positions of the unit filters G1, G2, G3, and G4. In the cavity lower layers 9121', 9122', 9123', and 9124', a volume ratio occupied by the second dielectric 126b in the first dielectric 126a may change according to the positions of the unit filters G1, G2, G3, and G4. The cavity upper layers 9121", 9122", 9123", and 9124" may respectively include dielectric patterns changing according to the positions of the unit filters G1, G2, G3, and G4. In the cavity upper layers 9121", 9122", 9123", and 9124", a volume ratio occupied by the fourth dielectric 127b in the third dielectric 127a may change according to the positions of the unit filters G1, G2, G3, and G4.

FIG. 24 shows an example in which the unit filters G1, G2, G3, and G4 are respectively at positions where the CRA of the incident light is 0 degrees, 10 degrees, 20 degrees, and 30 degrees. In the unit filter G1, the volume ratio of titanium oxide forming the second dielectric 126b of the cavity lower layer 9121' is 30%, and the volume ratio of titanium oxide forming the fourth dielectric 127b of the cavity upper layer 9121" is 30%. In the unit filter G2, the volume ratio of titanium oxide forming the second dielectric 126b of the cavity lower layer 9122' is 30%, and the volume ratio of titanium oxide forming the fourth dielectric 127b of the cavity upper layer 9122" is 35%. In the unit filter G3, the volume ratio of titanium oxide forming the second dielectric 126b of the cavity lower layer 9123' is 30%, and the volume ratio of titanium oxide forming the fourth dielectric 127b of the cavity upper layer 9123" is 45%. In the unit filter G4, the volume ratio of titanium oxide forming the second dielectric 126b of the cavity lower layer 9124' is 50%, and the volume ratio of titanium oxide forming the fourth dielectric 127b of the cavity upper layer 9124" is 40%.

Figure 25A:
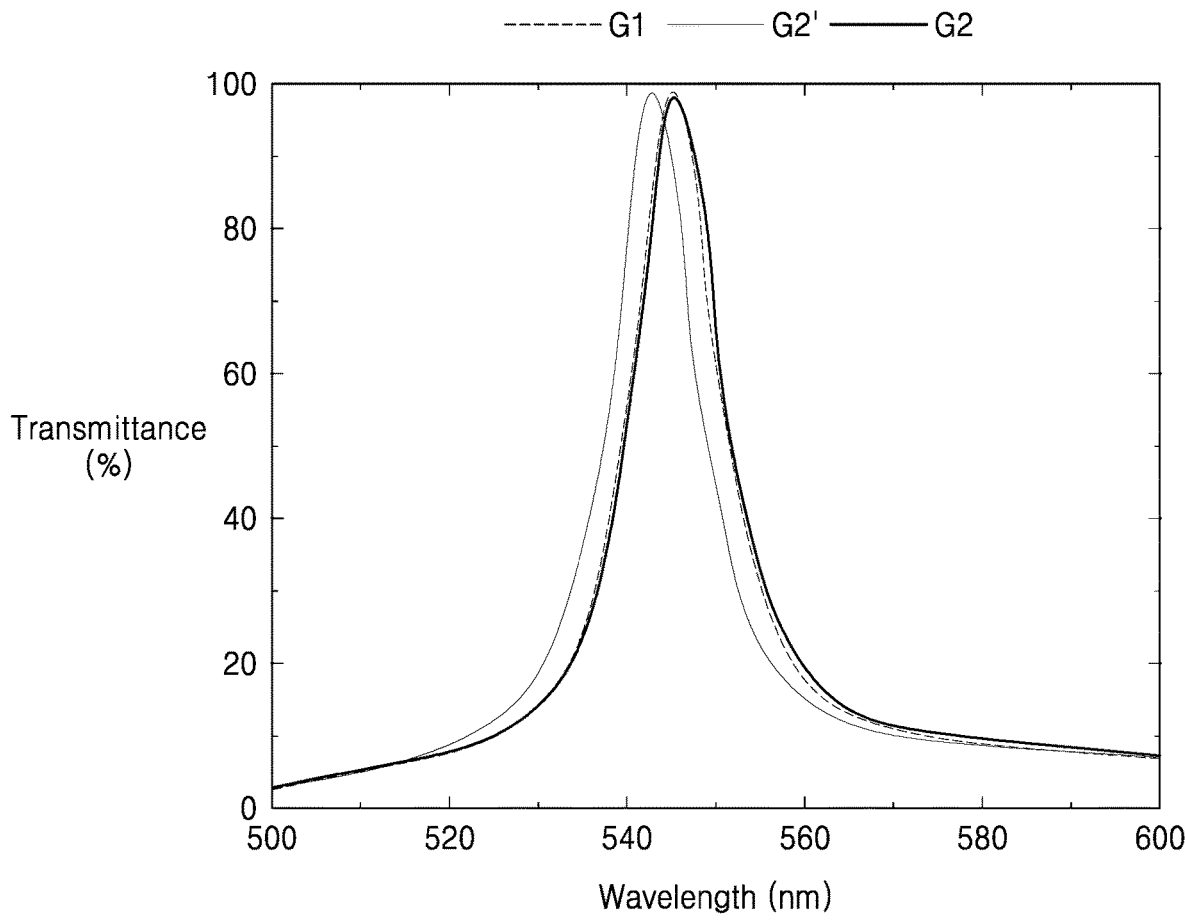
FIGS. 25A to 25C illustrate simulation results showing transmission spectrums of unit filters shown in FIG. 24.
Figure 25B:
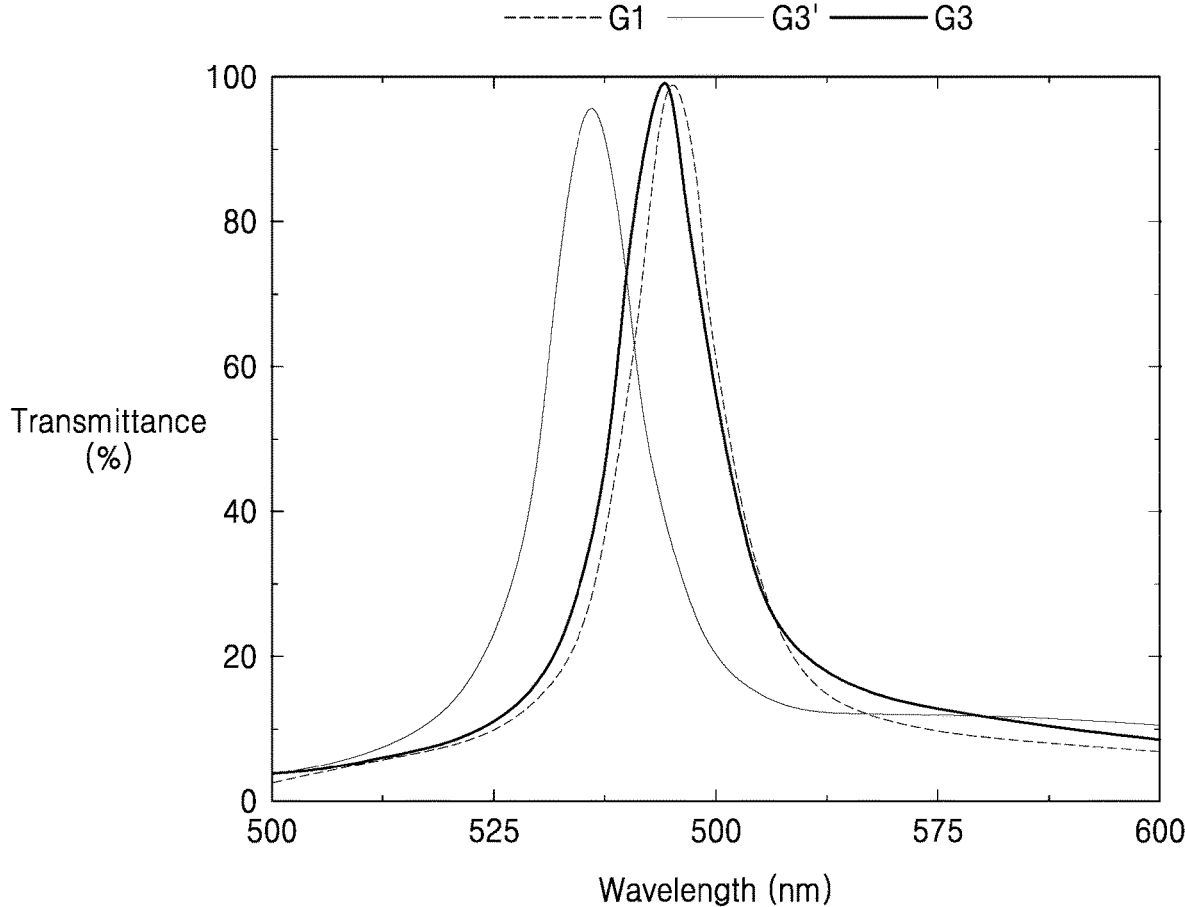
Figure 25C:
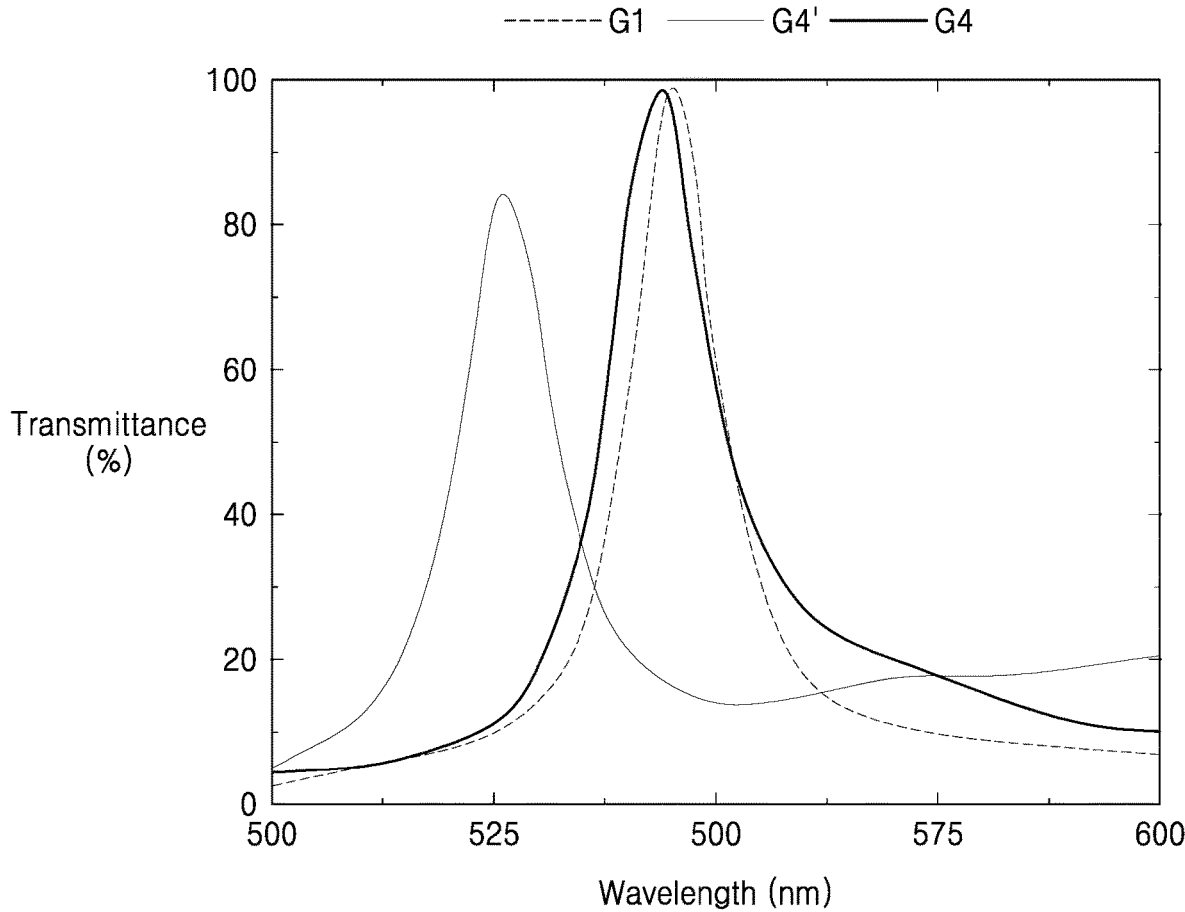

FIGS. 25A to 25C are simulation results showing transmission spectrums of unit filters shown in FIG. 24. In FIGS. 25A to 25C, "G1" denotes a transmission spectrum of the unit filter G1 at a position where the CRA of the incident light is 0 degrees.

FIG. 25A shows a transmission spectrum of the unit filter G2. In FIG. 25A, "G2" denotes a transmission spectrum of the unit filter G2 at a position where the CRA of the incident light is 10 degrees, and "G2'" denotes a transmission spectrum when the unit filter G1 moves to the position where the CRA of the incident light is 10 degrees. FIG. 25B shows a transmission spectrum of the unit filter G3. In FIG. 25B, "G3" denotes a transmission spectrum of the unit filter G3 at a position where the CRA of the incident light is 20 degrees, and "G3'" denotes a transmission spectrum when the unit filter G1 moves to the position where the CRA of the incident light is 20 degrees. FIG. 25C shows a transmission spectrum of the unit filter G4. In FIG. 25C, "G4" denotes a transmission spectrum of the unit filter G4 at a position where the CRA of the incident light is 30 degrees, and "G4'" denotes a transmission spectrum when the unit filter G1 moves to the position where the CRA of the incident light is 30 degrees.

As shown in FIGS. 25A to 25C, it may be seen that a central wavelength shift occurs when the unit filter G1 in the position where the CRA of the incident light is 0 degrees moves to the position where the CRA of the incident light is 10 degrees, 20 degrees, and 30 degrees, respectively.

Referring to FIG. 25A, when the unit filter G2 in which the volume ratio of titanium oxide increases by 5% in the cavity upper layer 9122" compared to the unit filter G1 is disposed at a position where the CRA of the incident light is 10 degrees, the same central wavelength as that of the unit filter G1 at the position where the CRA of the incident light is 0 degree may be obtained. Referring to FIG. 25B, when the unit filter G3 in which the volume ratio of titanium oxide increases by 15% in the cavity upper layer 9123" compared to the unit filter G1 is disposed at a position where the CRA of the incident light is 20 degrees, the same central wavelength as that of the unit filter G1 at the position where the CRA of the incident light is 0 degrees may be obtained. Referring to FIG. 25C, when the unit filter G4 in which the volume ratio of titanium oxide increases by 20% in the cavity lower layer 9124' and 10% in the cavity upper layer 9124" compared to the unit filter G1 is disposed at a position where the CRA of the incident light is 30 degrees, the same central wavelength as that of the unit filter G1 at the position where the CRA of the incident light is 0 degrees may be obtained.

As described above, the central wavelength shift occurred according to the change in the CRA of the incident light may be compensated for by changing only the refractive index of any one of the cavity lower layers 9121', 9122', 9123', and 9124' and the cavity upper layers 9121", 9122", 9123", and 9124" when a change in the CRA of the incident light is small, and by changing the refractive indices of all of the cavity lower layers 9121', 9122', 9123', and 9124' and the cavity upper layers 9121", 9122", 9123", and 9124" when the change in the CRA of the incident light is great.

Figure 26:
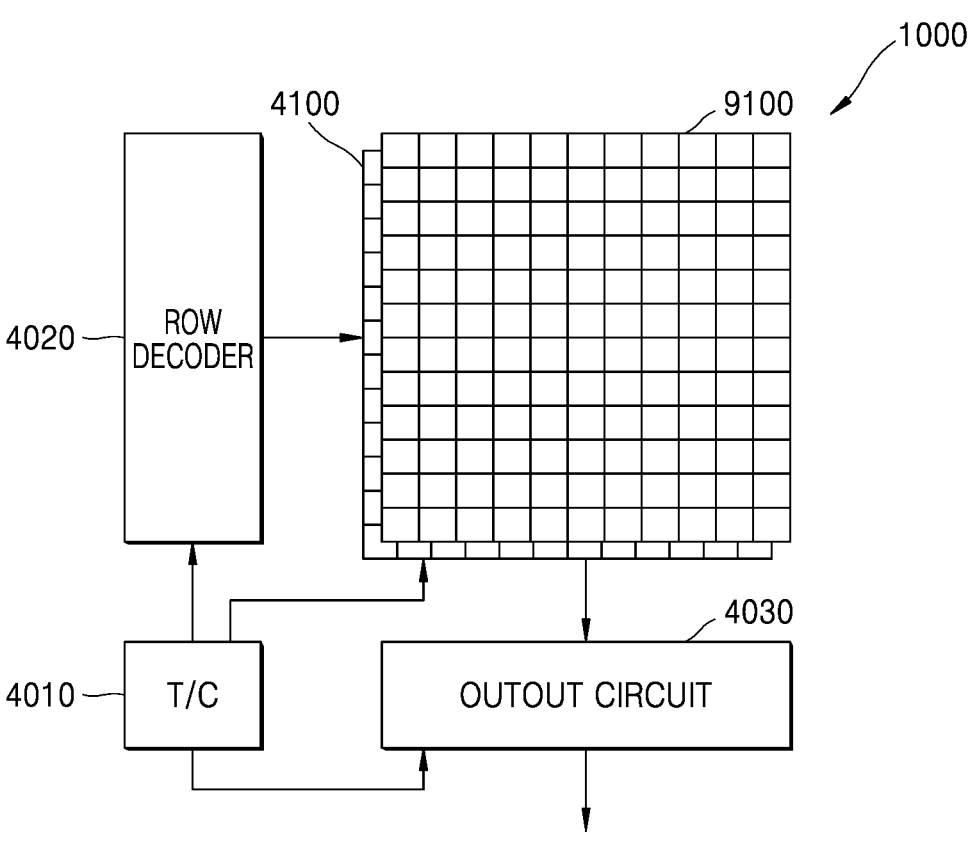
FIG. 26 is a block diagram of an image sensor according to an embodiment.

FIG. 26 is a block diagram of an image sensor according to an embodiment.

Referring to FIG. 26, an image sensor 1000 may include a spectral filter 9100, a pixel array 4100, a timing controller 4010, a row decoder 4020, and an output circuit 4030. The image sensor 1000 may include a charge coupled device (CCD) image sensor or a complementary metal oxide semiconductor (CMOS) image sensor, but the disclosure is not limited thereto.

The spectral filter 9100 includes a plurality of first filter arrays and a plurality of second filter arrays, which have been described above. The pixel array 4100 may include a plurality of pixels that detect light of different wavelengths that transmitted through the unit filters. Specifically, the pixel array 4100 may include pixels arranged in two dimensions along a plurality of rows and columns. The row decoder 4020 may select one of the rows of the pixel array 4100 in response to a row address signal output from the timing controller 4010. The output circuit 4030 may output a light detection signal in units of columns from the pixels arranged in a selected row. To this end, the output circuit 4030 may include a column decoder and an analog to digital converter (ADC). For example, the output circuit 4030 may include a plurality of ADCs arranged for each column between the column decoder and the pixel array 4100, or a single ADC arranged at an output end of the column decoder. The timing controller 4010, the row decoder 4020, and the output circuit 4030 may be implemented by a single chip or separate chips. A processor for processing an image signal output through the output circuit 4030 may be implemented by a single chip with the timing controller 4010, the row decoder 4020, and the output circuit 4030. The pixel array 4100 may include a plurality of pixels that detect light of different wavelengths, and the pixels may be arranged in various methods.

The image sensor 1000 including the spectral filter described above may be employed in various high performance optical devices or high performance electronic devices. The electronic devices may include, for example, smart phones, mobile phones, cellular phones, personal digital assistants (PDAs), laptop computers, personal computers (PCs), various portable devices, home appliances, security cameras, medical cameras, automobiles, Internet of Things (IoT) devices, and other mobile or no-mobile computing devise, but the disclosure is not limited thereto.

The electronic devices may further include, in addition to the image sensor 1000, a processor for controlling an image sensor, for example, an application processor (AP), control a number of hardware or software constituent elements by driving operating systems or application programs through the processor, and perform various data processing and calculations. The processors may further include graphics processing units (GPUs) and/or image signal processors. When the processors include image signal processors, an image (or video) obtained through an image sensor may be stored and/or output using the processor.

Figure 27:
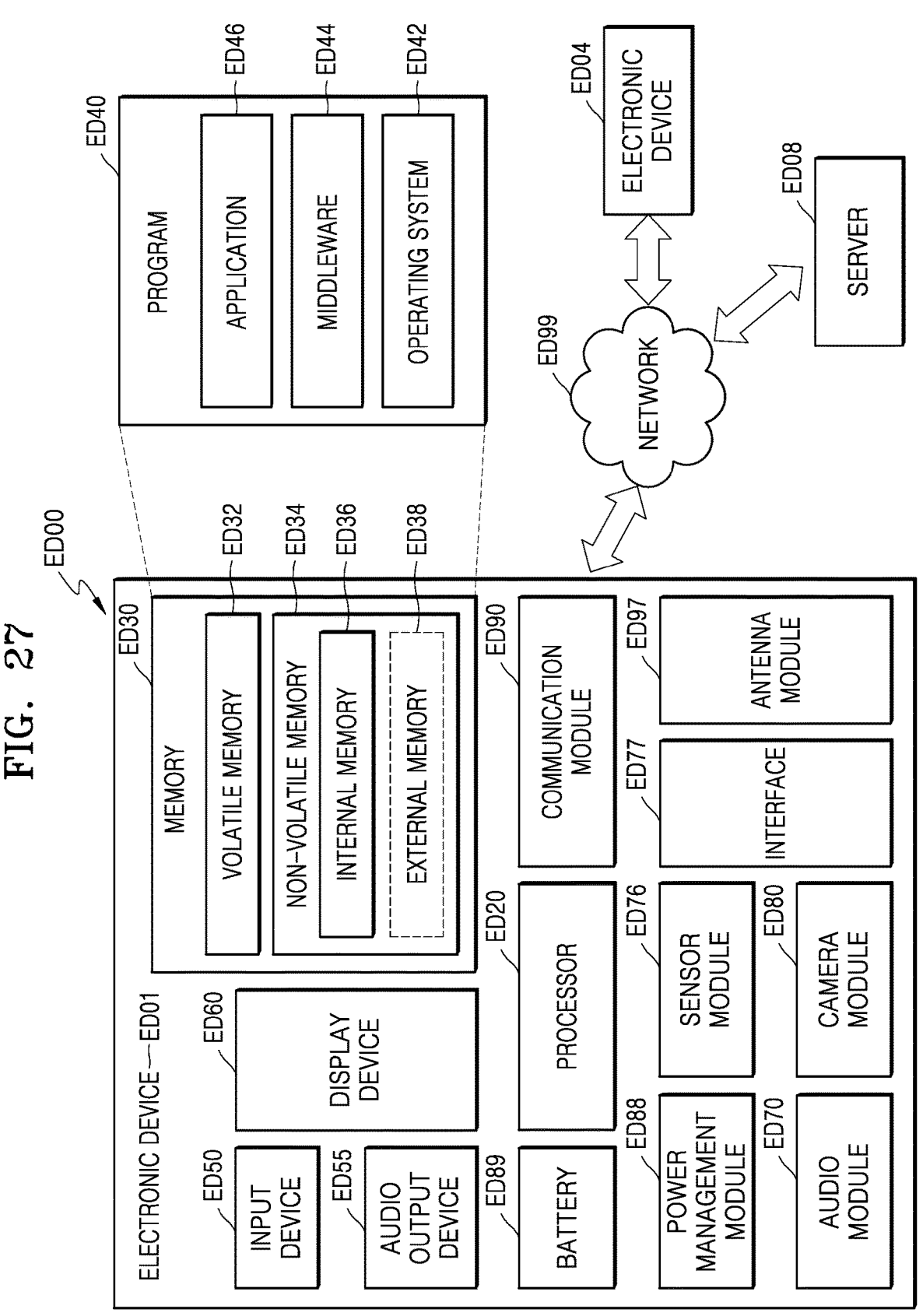
FIG. 27 is a schematic block diagram of an electronic device including an image sensor, according to some embodiments.

FIG. 27 is a block diagram of an electronic device ED01 including the image sensor 1000.

Referring to FIG. 27, in a network environment ED00, the electronic device ED01 may communicate with another electronic device ED02 or communicate with a server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, and/or an antenna module ED97. In the electronic device ED01, some (the display device ED60, etc.) of constituent elements may be omitted or other constituent elements may be added. Some of the constituent elements may be implemented by one integrated circuit. For example, the sensor module ED76 (a fingerprint sensor, an iris sensor, an illuminance sensor, etc.) may be implemented by being embedded in the display device ED60 (a display, etc.) Furthermore, when the image sensor 1000 includes a spectral function, some functions (a color sensor and an illuminance sensor) of the sensor module ED76 may be implemented by the image sensor 1000, not by a separate sensor module.

The processor ED20 may control one or a plurality of other constituent elements (hardware and software constituent elements, etc.) of the electronic device ED01 connected to the processor ED20 by executing software (a program ED40, etc.), and perform various data processing or calculations. As part of the data processing or calculations, the processor ED20 may load, in a volatile memory ED32, commands and/or data received from other constituent elements (the sensor module ED76, the communication module ED90, etc.), process the command and/or data stored in the volatile memory ED32, and store result data in a non-volatile memory ED34.

The memory ED30 may store various data needed by the constituent elements (the processor ED20, the sensor module ED76, etc.) of the electronic device ED01. The data may include, for example, software (the program ED40, etc.) and input data and/or output data about commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored in the memory ED30 as software, and may include an operating system ED42, middleware ED44, and/or an application ED46. The camera module ED80 may capture a still image and a video. The camera module ED80 may include a lens assembly including one or a plurality of lenses, the image sensor 1000 of FIG. 1, image signal processors, and/or flashes. The lens assembly included in the camera module ED80 may collect light emitted from a subject for image capturing.

Figure 28:
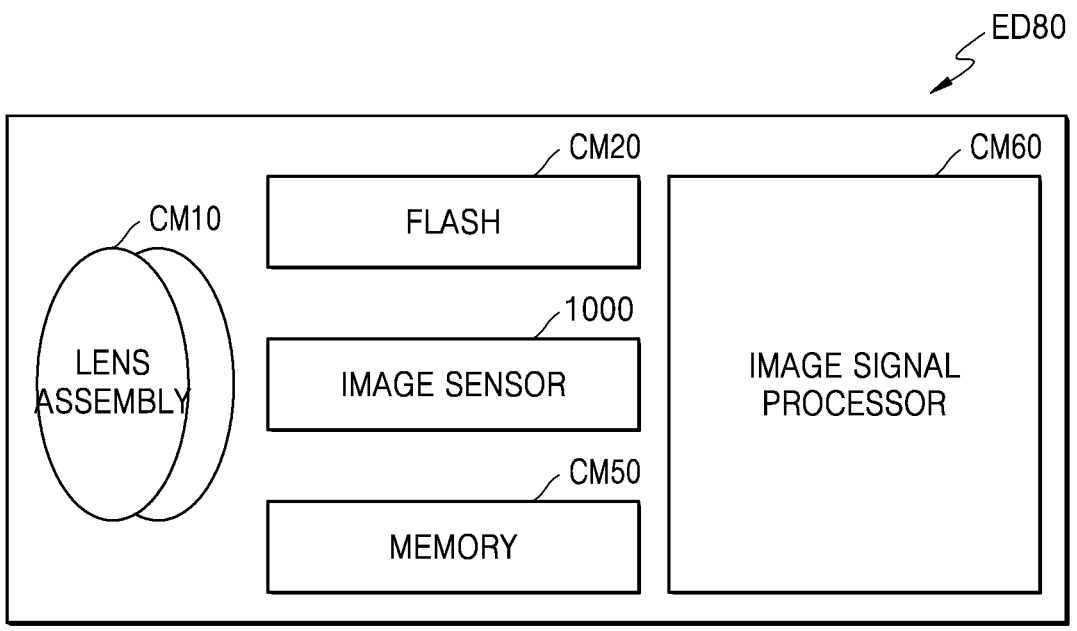
FIG. 28 is a schematic block diagram of a camera module of FIG. 27.

FIG. 28 is a schematic block diagram of the camera module ED80 of FIG. 27.

Referring to FIG. 28, the camera module ED80 may include a lens assembly CM10, a flash CM20, the image sensor 1000 (the image sensor 1000 of FIG. 29, etc.), a memory CM50 (a buffer memory, etc.), and/or an image signal processor CM60. The lens assembly CM10 may collect light emitted from a subject for image capturing. The camera module ED80 may include a plurality of lens assemblies CM10, and in this case, the camera module ED80 may include a dual camera, a 360 degrees camera, or a spherical camera. Some of the lens assemblies CM10 may have the same lens attributes (a viewing angle, a focal length, auto focus, F Number, optical zoom, etc.), or different lens attributes. The lens assembly CM10 may include a wide angle lens or a telescopic lens. A dual or multi-camera module may have a combination of different attributes of a filter array.

The flash CM20 may emit light used to reinforce light emitted or reflected from a subject. The flash CM20 may include one or a plurality of light-emitting diodes (a red-green-blue (RGB) LED, a white LED, an infrared LED, an ultraviolet LED, etc.), and/or a xenon lamp. The image sensor 1000 may include the image sensor of FIG. 1, and convert light emitted or reflected from the subject and transmitted through the lens assembly CM10 into electrical signals, thereby obtaining an image corresponding to the subject. The image sensor 1000 may include one or a plurality of sensors selected from image sensors having different attributes such as an RGB sensor, a black and white (BW) sensor, an IR sensor, or UV sensor. Each sensor included in the image sensor 1000 may be implemented by a charged coupled device (CCD) sensor and/or a complementary metal oxide semiconductor (CMOS) sensor.

The memory CM50 may store a part or entire data of an image obtained through the image sensor 1000 for a subsequent image processing operation. For example, when a plurality of images are obtained at high speed, only low resolution images are displayed while the obtained original data (Bayer-Patterned data, high resolution data, etc.) is stored in the memory CM50. Then, the memory CM50 may be used to transmit the original data of a selected (user selection, etc.) image to the image signal processor CM60. The memory CM50 may be incorporated into the memory ED30 of the electronic device ED01, or configured to be an independently operated separate memory.

The image signal processor CM60 may perform image processing on the image obtained through the image sensor 1000 or the image data stored in the memory CM50. The image processing may include depth map generation, three-dimensional modeling, panorama generation, feature point extraction, image synthesis, and/or image compensation (noise reduction, resolution adjustment, brightness adjustment, blurring, sharpening, softening, etc.) The image signal processor CM60 may perform control (exposure time control, or read-out timing control, etc.) on constituent elements (the image sensor 1000, etc.) included in the camera module ED80. The image processed by the image signal processor CM60 may be stored again in the memory CM50 for additional processing or provided to external constituent elements (the memory ED30, the display device ED60, the electronic device ED02, the electronic device ED04, the server ED08, and the like) of the camera module ED80. The image signal processor CM60 may be incorporated into the processor ED20, or configured to be a separate processor operated independently of the processor ED20. When the image signal processor CM60 is configured by a separate processor from the processor ED20, the image processed by the image signal processor CM60 may undergo additional image processing by the processor ED20 and then displayed through the display device ED60.

Referring back to FIG. 27, the electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a read side camera. In addition, the camera module ED80 may be a combined camera module in which an image sensor including an existing RGB three-color filter and a spectral image sensor including a spectral filter are combined and data of the combined two image sensors is integrated and processed.

Figure 29:
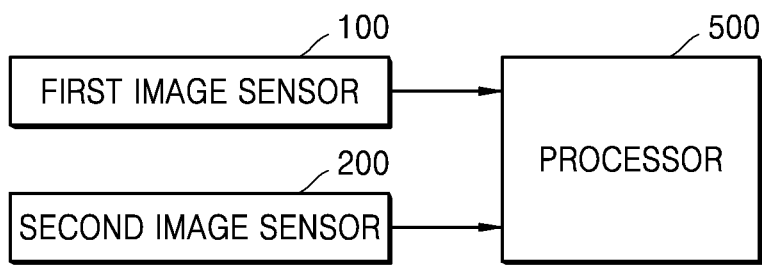
FIG. 29 is a block diagram showing a schematic structure of a composite camera module including a plurality of image sensors having different attributes.

FIG. 29 is a block diagram showing a schematic structure of a composite camera module including a plurality of image sensors having different attributes. Here, a first image sensor 100 may be an existing RGB image sensor, and a second image sensor 200 may be a multispectral image (MSI) sensor.

The RGB image sensor may be a CMOS image sensor. The RGB sensor may generate images of three channels by sensing spectrums representing R, G, and B using a Bayer color filter array. Also, the RGB sensor may use other types of color filter arrays. The MSI sensor senses and displays light of a different wavelength than the RGB image sensor. The MSI sensor has a larger number of channels to sense light of more types of wavelengths.

The processor 500 may process image information obtained from each of the image sensors 100 and 200 and combine data in a desired method to improve image quality or performance of identifying an object in an image.

Figure 30:
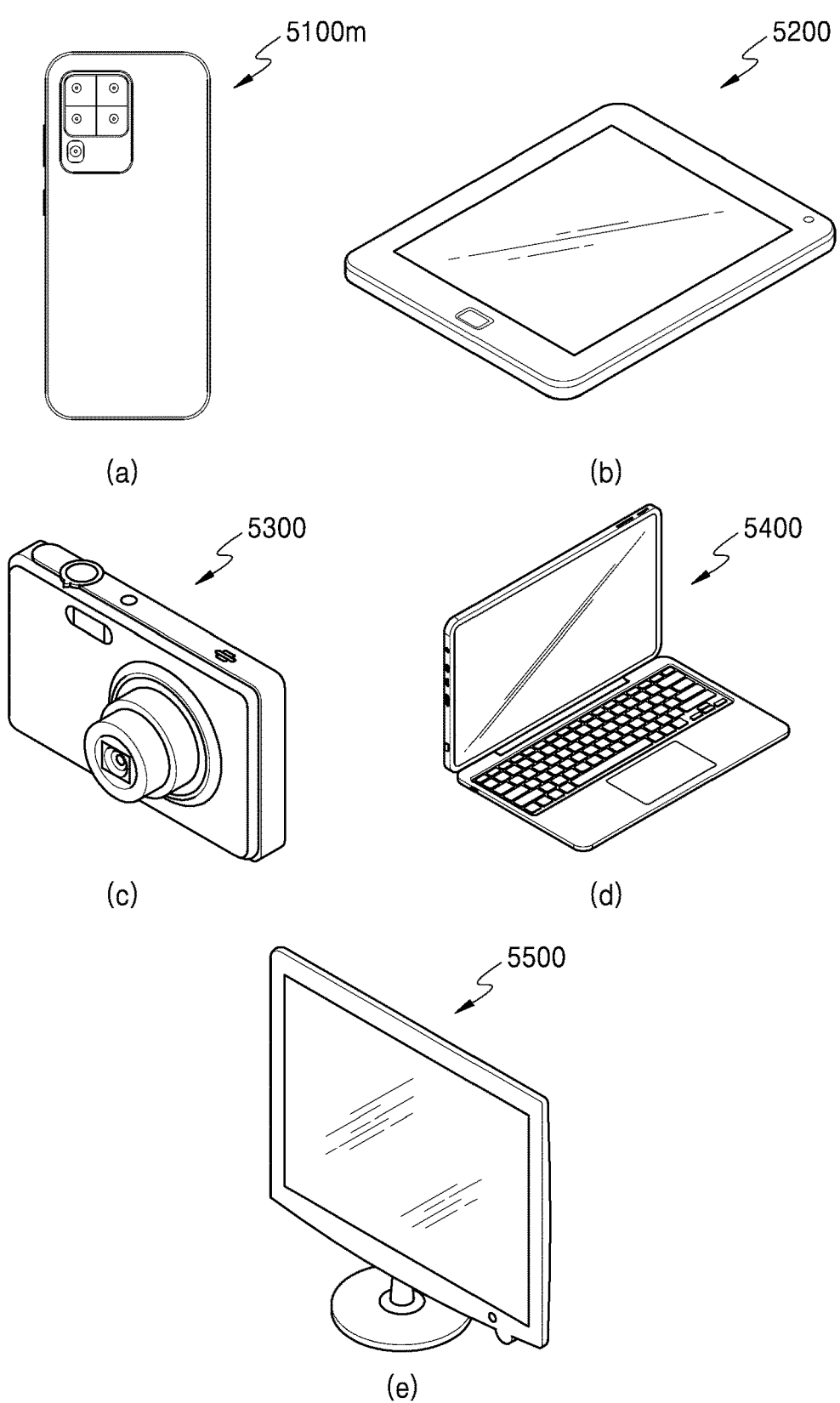
FIGS. 30 and 31 are diagrams of various examples of an electronic device to which an image sensor according to an embodiment is applied.

The image sensor 1000 according to embodiments may be applied to a mobile phone or smartphone 5100m illustrated in (a) of FIG. 30, a tablet or smart tablet 5200 illustrated in (b) of FIG. 30, a digital camera or camcorder 5300 illustrated in (c) of FIG. 30, a notebook computer 5400 illustrated in (d) of FIG. 30, a television or smart television 5500 illustrated in (e) of FIG. 30, etc. For example, the smartphone 5100m or the smart tablet 5200 may include a plurality of high resolution cameras, each having a high resolution image sensor mounted thereon. Depth information of subjects in an image may be extracted by using a high resolution cameras, out focusing of the image may be adjusted, or subjects in the image may be automatically identified.

Figure 31:
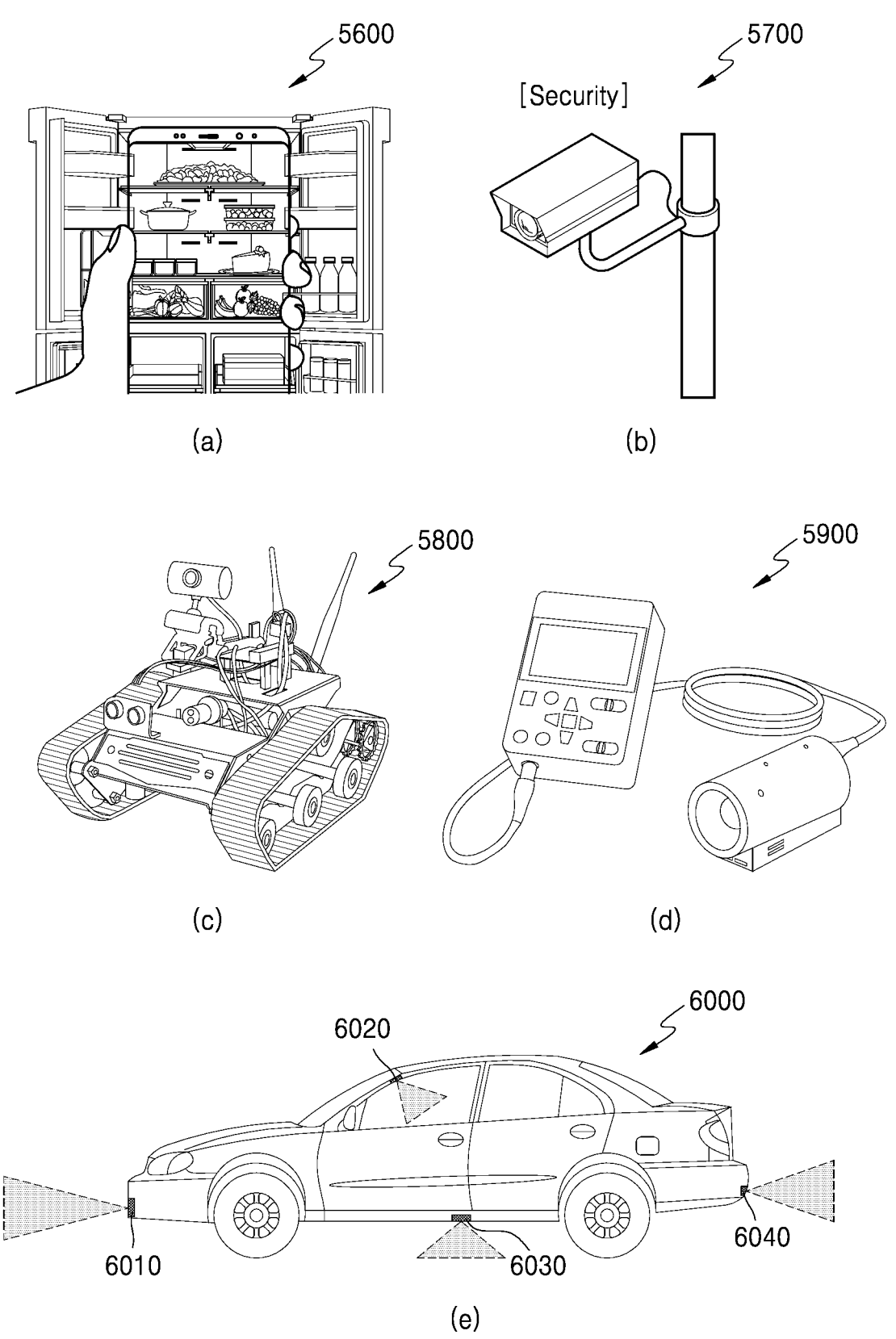

The image sensor 1000 may be applied to a smart refrigerator 5600 illustrated in (a) of FIG. 31, a security camera 5700 illustrated in (b) of FIG. 31, a robot 5800 illustrated in (c) of FIG. 31, a medical camera 5900 illustrated in (d) of FIG. 31, etc. For example, the smart refrigerator 5600 may automatically recognize food in a refrigerator, by using an image sensor, and notify a user of the presence of a particular food, the type of food that is input or output, and the like, through a smartphone. The security camera 5700 may provide an ultrahigh resolution image and may recognize an object or a person in an image in a dark environment by using high sensitivity. The robot 5800 may be provided in a disaster or industrial site that is not directly accessible by people, and may provide a high resolution image. The medical camera 5900 may provide a high resolution image for diagnosis or surgery, and thus a field of vision may be dynamically adjusted.

The image sensor 1000 may be applied to a vehicle 6000 as illustrated in (e) of FIG. 31. The vehicle 6000 may include a plurality of vehicle cameras 6010, 6020, 6030, and 6040 arranged at various positions. Each of the vehicle cameras 6010, 6020, 6030, and 6040 may include an image sensor according to an embodiment. The vehicle 6000 may provide a driver with various pieces of information about the inside or periphery of the vehicle 6000, by using the vehicle cameras 6010, 6020, 6030, and 6040, thereby providing an object or a person in an image may be automatically recognized and information needed for autonomous driving.

A spectral filter includes first and second filter arrays. The first filter array includes a plurality of band filters each transmitting light of a specific band, and the second filter array includes a plurality of unit filters having central wavelengths of different bands. In the second filter array, a cavity lower layer and a cavity upper layer constituting a cavity are separated by a dielectric separation layer, and thus, the cavity lower layer and the cavity upper layer may be formed by a separate etching process in the manufacturing process of the cavity. Accordingly, an etching process for forming the cavity lower layer and the cavity upper layer may be easily performed, reproducibility may be improved, and the effective refractive index of the cavity may be efficiently adjusted.

Although the image sensor including the above-described spectral filter and the electronic device including the image sensor have been described with reference to the embodiment shown in the drawings, this is only an example, and it will be understood by those of ordinary skill in the art that various modifications and other equivalent embodiments therefrom are possible.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A spectral filter comprising:
a plurality of first filter arrays, each of the plurality of first filter arrays comprising a plurality of band filters; and
a plurality of second filter arrays respectively provided on the plurality of first filter arrays, each of the plurality of second filter arrays comprising a plurality of unit filters respectively corresponding to the plurality of band filters,
wherein each of the plurality of unit filters comprises:
a first reflecting plate;
a second reflecting plate disposed above the first reflecting plate; and
a single cavity between the first and second reflecting plates, the single cavity having a single central wavelength,
wherein the single cavity comprises a cavity lower layer, a cavity upper layer, and a dielectric separation layer disposed between the cavity lower layer and the cavity upper layer,
wherein the dielectric separation layer has a refractive index less than or equal to a maximum refractive index of the cavity lower layer of the single cavity and the cavity upper layer of the single cavity,
wherein each of the plurality of band filters is configured to transmit light in a specific band,
wherein the cavities of two or more of the plurality of unit filters are configured to have a same effective refractive index, and wherein a central wavelength of each unit filter of the plurality of unit filters corresponds to the single central wavelength of the single cavity included in each of the plurality of unit filters.

2. The spectral filter of claim 1, wherein the dielectric separation layer is made of a material that has a refractive index less than or equal to a highest refractive index of materials constituting the cavity lower layer of the single cavity and the cavity upper layer of the single cavity.

3. The spectral filter of claim 1, wherein the central wavelength of the single cavity is in a wavelength range of 400 nm to 700 nm.

4. The spectral filter of claim 1, wherein the single cavity has a thickness of 100 nm to 2,000 nm.

5. The spectral filter of claim 1, wherein the dielectric separation layer includes at least one of hafnium oxide ($HfO_2$) or titanium oxide ($TiO_2$).

6. The spectral filter of claim 1, wherein the dielectric separation layer has a thickness of 10 nm to 100 nm.

7. The spectral filter of claim 1, wherein each of the plurality of first filter arrays includes a color filter array or a broadband filter array.

8. The spectral filter of claim 1, wherein the single cavity has a uniform thickness and comprises a specific dielectric pattern.

9. The spectral filter of claim 8, wherein the cavity lower layer and the cavity upper layer of each of the single cavity included in each unit filter of the plurality of unit filters are of different thicknesses.

10. The spectral filter of claim 8, wherein the specific dielectric pattern of the single cavity includes a lower dielectric pattern of the cavity lower layer and an upper dielectric pattern of the cavity upper layer.

11. The spectral filter of claim 8, wherein the specific dielectric pattern of two or more cavities included in two or more of the plurality of unit filters are identical.

12. The spectral filter of claim 1, wherein each of the plurality of first filter arrays and each of the plurality of second filter arrays form a channel array having N channels, each of the N channels including a corresponding band filter of the plurality of band filters and a unit filter of the plurality of unit filters, and wherein when a number of band filters of different types is A, a number N' of cavities having different effective refractive indices satisfies N/A≤N'<N.

13. The spectral filter of claim 1, wherein unit filters having a same central wavelength among the plurality of second filter arrays are configured such that effective refractive indices of cavities included in the plurality of unit filters vary according to positions of the unit filters so as to compensate for a central wavelength shift caused by a change in a chief ray angle (CRA) of an incident light.

14. The spectral filter of claim 1, wherein each of the first and second reflecting plates includes a metal reflecting plate or a Bragg reflecting plate.

15. The spectral filter of claim 1, wherein the single cavity further comprises:

a cavity intermediate layer provided between the dielectric separation layer and the cavity upper layer; and an additional dielectric separation layer provided between the cavity intermediate layer and the cavity upper layer.

16. An image sensor comprising:

a pixel array comprising a plurality of pixels; and a spectral filter provided on the pixel array, wherein the spectral filter comprises:

a plurality of first filter arrays, each of the plurality of first filter arrays comprising a plurality of band filters; and a plurality of second filter arrays respectively provided on the plurality of first filter arrays, each of the plurality of second filter arrays comprising a plurality of unit filters respectively corresponding to the plurality of band filters, wherein each of the plurality of unit filters comprises:

a first reflecting plate;

a second reflecting plate disposed above the first reflecting plate; and a single cavity between the first and second reflecting plates, the single cavity having a single central wavelength, wherein the single cavity comprises a cavity lower layer, a cavity upper layer, and a dielectric separation layer disposed between the cavity lower layer and the cavity upper layer, wherein the dielectric separation layer has a refractive index less than or equal to a maximum refractive index of the cavity lower layer of the single cavity and the cavity upper layer of the single cavity, wherein each of the plurality of band filters is configured to transmit light in a specific band, wherein the cavities of two or more of the plurality of unit filters are configured to have a same effective refractive index, and wherein a central wavelength of each unit filter of the plurality of unit filters corresponds to the single central wavelength of the single cavity included in each of the plurality of unit filters.

17. The image sensor of claim 16, wherein each of the plurality of pixels comprises:

a wiring layer comprising a driving circuit therein, and a photodiode disposed on the wiring layer.

18. The image sensor of claim 16, wherein each of the plurality of first filter arrays includes a color filter array or a broadband filter array.

19. The image sensor of claim 16, wherein the single cavity is configured to have central wavelengths of different bands in a wavelength range of 400 nm to 700 nm.

20. An electronic device comprising an image sensor, wherein the image sensor comprises:

a pixel array comprising a plurality of pixels, and a spectral filter provided on the pixel array, wherein the spectral filter comprises:

a plurality of first filter arrays, each of the plurality of first filter arrays comprising a plurality of band filters; and a plurality of second filter arrays respectively provided on the plurality of first filter arrays, each of the plurality of second filter arrays comprising a plurality of unit filters respectively corresponding to the plurality of band filters, wherein each of the plurality of unit filters comprises:

a first reflecting plate;

a second reflecting plate disposed above the first reflecting plate; and a single cavity between the first and second reflecting plates, the single cavity having a single central wavelength, wherein the single cavity comprises a cavity lower layer, a cavity upper layer, and a dielectric separation layer disposed between the cavity lower layer and the cavity upper layer, wherein the dielectric separation layer has a refractive index less than or equal to a maximum refractive index of the cavity lower layer of the single cavity and the cavity upper layer of the single cavity, wherein each of the plurality of band filters is configured to transmit light in a specific band, and wherein the cavities of two or more of the plurality of unit filters are configured to have a same effective refractive index, and wherein a central wavelength of each unit filter of the plurality of unit filters corresponds to the single central wavelength of the single cavity included in each of the plurality of unit filters.

21. The spectral filter of claim 8, wherein the cavity lower layer and the cavity upper layer of the single cavity are of uniform thickness.

* * * * *